US 6,742,507 B2

(12) United States Patent
Keefer et al.

(10) Patent No.: US 6,742,507 B2
(45) Date of Patent: Jun. 1, 2004

(54) FEED COMPOSITION MODIFICATION FOR INTERNAL COMBUSTION ENGINES

(75) Inventors: Bowie G. Keefer, Vancouver (CA); Daniel K. Mather, Madison, WI (US); David E. Foster, Madison, WI (US); Denis J. Connor, West Vancouver (CA); Carl F. Hunter, West Vancouver (CA); Todd Smith, Vancouver (CA)

(73) Assignee: QuestAir Technologies, Inc., Burnaby (CA)

( * ) Notice: Subject to any disclaimer, the term of this patent is extended or adjusted under 35 U.S.C. 154(b) by 0 days.

(21) Appl. No.: 10/039,491

(22) Filed: Oct. 26, 2001

(65) Prior Publication Data

US 2002/0104518 A1 Aug. 8, 2002

Related U.S. Application Data

(60) Provisional application No. 60/292,803, filed on May 22, 2001.

(30) Foreign Application Priority Data

Nov. 2, 2000 (CA) .............................................. 2324533

(51) Int. Cl.⁷ ................................................ F02B 23/00

(52) U.S. Cl. ....................................... 123/585; 123/527

(58) Field of Search .................................. 123/585, 590, 123/567, 568.11, 568.12, 568.13, 568.14, 568.15, 527, 528, 531, 532, 536, 575, 1 A, 3, DIG. 12, 217, 250, 251, 252, 253, 254–305

(56) References Cited

U.S. PATENT DOCUMENTS

| 3,817,232 A | 6/1974 | Nakajima et al. |
| 4,041,910 A | * 8/1977 | Houseman ................. 123/58.8 |
| 4,230,072 A | 10/1980 | Noguchi et al. |
| 4,376,423 A | 3/1983 | Knapstein |
| 4,519,356 A | 5/1985 | Sarich |
| 4,554,945 A | 11/1985 | McKay |
| 4,574,754 A | 3/1986 | Rhoades, Jr. |
| 4,596,210 A | 6/1986 | Schmidtke |
| 4,681,071 A | 7/1987 | Smith |
| 4,883,023 A | 11/1989 | Tsang et al. |
| 5,203,298 A | * 4/1993 | Manolis ..................... 123/275 |
| 5,215,063 A | 6/1993 | Yeh |
| 5,245,974 A | 9/1993 | Watson et al. |
| 5,427,077 A | 6/1995 | Gilbert |
| 5,517,978 A | 5/1996 | Yi |
| 5,522,368 A | 6/1996 | Tusino |
| 5,526,641 A | 6/1996 | Sekar et al. |
| 5,546,902 A | 8/1996 | Paluch et al. |
| 5,553,591 A | 9/1996 | Yi |
| 5,636,619 A | 6/1997 | Poola et al. |

(List continued on next page.)

FOREIGN PATENT DOCUMENTS

| CA | 2312506 | 6/1999 |
| DE | 43 15 034 A1 | 11/1993 |
| DE | 44 19 439 A1 | 12/1995 |
| FR | 2 755 187 | 4/1998 |
| JP | 60169660 | 9/1985 |
| JP | 10205398 | 8/1998 |
| WO | WO 83/04243 | 12/1983 |
| WO | WO 92/13188 | 8/1992 |
| WO | WO 99/28013 | 6/1999 |
| WO | WO 00/16425 | 3/2000 |

OTHER PUBLICATIONS

Hans–Peter Alois Frisse, "*Sauerstoffanreicherung in Kombination mit Abgasrückführung als Konzept zur Verminderung der Schadstoffemission des Dieselmotors*".

*Primary Examiner*—Tony M. Argenbright
*Assistant Examiner*—Hyder Ali
(74) *Attorney, Agent, or Firm*—Klarquist Sparkman LLP

(57) ABSTRACT

A compact and efficient rotary pressure swing adsorption (PSA) apparatus with laminated sheet adsorbers is used to supply enriched oxygen and/or nitrogen streams to an internal combustion engine, allowing for reduced noxious emissions and enhanced engine performance.

56 Claims, 17 Drawing Sheets

U.S. PATENT DOCUMENTS

| | | |
|---|---|---|
| 5,640,845 A | 6/1997 | Ng et al. |
| 5,649,517 A | 7/1997 | Poola et al. |
| 5,655,505 A | 8/1997 | Tusino |
| 5,678,526 A | 10/1997 | Cullen et al. |
| 5,706,675 A | 1/1998 | Manikowski, Jr. |
| 5,829,417 A | 11/1998 | Nyffenegger |
| 5,908,023 A | 6/1999 | Stutzenberger |
| 5,960,777 A | 10/1999 | Nemser et al. |
| 6,051,050 A | 4/2000 | Keefer et al. |
| 6,055,808 A | 5/2000 | Poola et al. |
| 6,067,973 A | 5/2000 | Chanda et al. |
| 6,273,072 B1 | 8/2001 | Knapstein et al. |
| 6,352,068 B1 * | 3/2002 | Jacobsen .................. 123/585 |
| 6,397,825 B1 | 6/2002 | Klomp |

* cited by examiner

Changes in Emissions with Varying Engine Air Intake Composition and Auxiliary Gas Injection

US 6,742,507 B2

FEED COMPOSITION MODIFICATION FOR INTERNAL COMBUSTION ENGINES

CROSS REFERENCE TO RELATED APPLICATION

This application claims the benefit of Canadian Patent Application No. 2,324,533, filed Oct. 27, 2000, and U.S. Provisional Application No. 60/292,803, filed May 22, 2001, the disclosures of which are incorporated herein by reference.

FIELD

The present application concerns oxygen and/or nitrogen enrichment in internal combustion engines to reduce noxious emissions and in some embodiments to provide enhanced engine performance using a compact and efficient air separation apparatus based on pressure swing adsorption (PSA), preferably with a high frequency cycle.

BACKGROUND

While diesel engine power trains are highly efficient, they are severely challenged by the urgent need to meet clean air requirements for greatly reduced emissions of unburned hydrocarbons, carbon monoxide, obnoxious and potentially carcinogenic particulate matter, and NOx. The latter two, particulate matter and NOx, are especially challenging for diesel engine power trains. Typically, mitigation measures to reduce NOx tend to increase particulate matter emissions, while measures to reduce particulate emissions tend to increase NOx. Mitigation techniques in use or under development include using cleaner burning fuels, exhaust gas recirculation (EGR), particulate traps, improved after-treatment catalysts, selective reduction catalysts (SCR) using urea, and advanced after-treatment technologies including non-thermal plasma or corona discharge devices.

Some attention has been devoted over many years to the possibility of improving engine performance and addressing emissions problems by modifying the oxygen and nitrogen concentrations of air supplied to diesel and other internal combustion engines.

Oxygen enrichment can greatly reduce emissions of particulate matter, unburned hydrocarbons, CO and smoke, although at the risk of worsening NOx emissions. Some investigators have found that oxygen enrichment may significantly improve engine power density and gross thermal efficiency (before allowing for the parasitic power load of air separation). It has also been found that the tendency toward worsened NOx emissions may be offset in compression ignition engines by retarding the timing of fuel injection, thus achieving with modest oxygen enrichment (e.g. to 25% or less $O_2$) an attractive compromise with an overall modest improvement in all emission categories of incomplete combustion and NOx.

The opposite approach of nitrogen enrichment (e.g. to reduce $O_2$ concentration from the normal 21% to about 19%) has also been advocated as an alternative to EGR, reducing NOx emissions while avoiding the problems of accumulating abrasive or corrosive contaminants from the exhaust.

Examples of this approach include Maissant et al. (French Patent No. 2755187B1), Nakajima et al. (U.S. Pat. No. 3,817,232), Cullen et al. (U.S. Pat. No. 5,678,526), Yi (U.S. Pat. Nos. 5,517,978 and 5,553,591), Manikowski (U.S. Pat. No. 5,706,675), Tsang et al. (U.S. Pat. No. 4,883,023), Poola et al. (U.S. Pat. Nos. 5,636,619; 5,649,517 and 6,055,808), Sekar et al. (U.S. Pat. No. 5,526,641), Ng et al. (U.S. Pat. No. 5,640,845), Nemser et al. (U.S. Pat. No. 5,960,777) and Stutzenberger (U.S. Pat. No. 5,908,023).

A further approach advanced in the doctoral thesis of Daniel Mather and subsequently by Chanda et al. (U.S. Pat. No. 6,067,973) is late cycle injection of enriched oxygen to an engine cylinder, so that oxygen admitted late during cylinder expansion may improve the completeness of combustion without raising cylinder temperature high enough to adversely affect NOx levels.

Until now, despite many studies and experimental tests, auxiliary air separation equipment for combustion engines has proved to be impractical, because of excessive power consumption to achieve even a modest change between oxygen and nitrogen atmospheric concentrations. Furthermore, the additional equipment may be too bulky and too costly in relation to any emissions benefit provided.

Previous investigators of air separation for combustion engines have considered several established industrial technologies for air separation, including cryogenic distillation, pressure swing adsorption, and membrane permeation. Cryogenic air separation requires large plant sizes and bulky insulation to approach its best energy efficiency, and has been rejected as completely unsuitable for mobile applications. Conventional pressure swing adsorption processes have a large adsorbent inventory in relation to their productivity, and are prohibitively bulky for mobile applications.

Polymeric membrane systems have been selected by most prior investigators as the most promising available technology, because of their simplicity and relative compactness. However, the compactness of membrane systems is seriously compromised by operation at the relatively low differential pressures that may be considered in engine applications. Power consumption of blowers and/or vacuum pumps for a membrane system is too high in relation to performance benefits expected.

SUMMARY

The present processes and systems are concerned with application of a pressure swing adsorption system to air separation auxiliaries for internal combustion engines.

Gas separation by pressure swing adsorption is achieved by coordinated pressure cycling and flow reversals over an adsorber that preferentially adsorbs a more readily adsorbed component relative to a less readily adsorbed component of the mixture. The total pressure is elevated during intervals of flow in a first direction through the adsorber from a first end to a second end of the adsorber, and is reduced during intervals of flow in the reverse direction. As the cycle is repeated, the less readily adsorbed component is concentrated in the first direction, while the more readily adsorbed component is concentrated in the reverse direction.

A "light" product, depleted in the more readily adsorbed component and enriched in the less readily adsorbed component, is then delivered from the second end of the adsorber. A "heavy" product enriched in the more strongly adsorbed component is exhausted from the first end of the adsorber. The light product is usually the desired product to be purified, and the heavy product often a waste product, as in the important examples of oxygen separation over nitrogen-selective zeolite adsorbents and hydrogen purification. The heavy product (enriched in nitrogen as the more readily adsorbed component) is a desired product in the example of nitrogen separation over nitrogen-selective zeolite adsorbents. Typically, the feed is admitted to the first end of an adsorber and the light product is delivered from the second end of the adsorber when the pressure in that adsorber is elevated to a higher working pressure. The heavy product is exhausted from the first end of the adsorber at a lower working pressure. In order to achieve high purity of the light product, a fraction of the light product or gas enriched in the less readily adsorbed component may be recycled back to the adsorbers as "light reflux" gas after pressure letdown, e.g. to perform purge, pressure equalization or repressurization steps.

The conventional process for gas separation by pressure swing adsorption uses two or more adsorbers in parallel, with directional valving at each end of each adsorber to connect the adsorbers in alternating sequence to pressure sources and sinks, thus establishing the changes of working pressure and flow direction. The basic pressure swing adsorption process also makes inefficient use of applied energy, because of irreversible expansion over the valves while switching the adsorbers between higher and lower pressures. More sophisticated conventional pressure swing adsorption devices achieve some improvement in efficiency by use of multiple pressure equalization steps and other process refinements, but complexity of the valve logic based on conventional 2-way valves is greatly increased. Furthermore, the cycle frequency with conventional valves and granular adsorbent cannot be greatly increased, so the adsorbent inventory is large. Conventional PSA plants are accordingly so bulky and heavy that their use to enrich oxygen or nitrogen for internal combustion engines may be less than ideal, particularly for any vehicle applications.

By operating with high-surface-area, laminated adsorbers, with the adsorbent supported in thin sheets separated by spacers to define flow channels between adjacent sheets, and with the adsorbers mounted in a rotor to provide the PSA process valve logic with only one moving part, a high frequency PSA cycle (e.g., at least 25 cycles/minute) can be performed in an extremely compact apparatus as disclosed by Keefer et al (Canadian Patent application Nos. 2,312,506, 2,274,286 and 2,274,318). Alternatively, a PSA unit that achieves more than 1 PSA cycle per rotor revolution could be used in the presently disclosed processes and systems. Particular embodiments of the disclosed processes and systems provide for using such compact PSA devices in conjunction with internal combustion engines to provide oxygen and/or nitrogen enrichment in order to address the problems of emissions of unburned hydrocarbons, particulate, carbon monoxide, and NOx; while also to achieve favourable power density and overall efficiency.

Increasing the oxygen flow to the engine offers the benefits of reduced particulate emissions and increased engine gross power output, while also facilitating ignition of lower-grade fuels.

Increasing the nitrogen concentration of air fed to the engine potentially reduces nitrogen oxide emissions without the problems caused by exhaust gas recirculation (engine wear, oil contamination).

According to one disclosed embodiment, a process and system is described for providing fuel and an oxygen-enriched stream to at least one chamber of an internal combustion engine, comprising providing at least one pressure swing adsorption module that produces an oxygen-enriched stream; providing an internal combustion engine chamber that includes a first combustion zone and a second combustion zone; providing a fuel-rich mixture of the oxygen-enriched stream and a first fuel in the first combustion zone of the internal combustion engine chamber; and providing a fuel-lean mixture of air and a second fuel in the second combustion zone of the internal combustion engine chamber. According to one variant, the process is directed to igniting a gaseous fuel in an internal combustion engine and includes providing a fuel-lean mixture of air and gaseous fuel in a primary combustion zone of the internal combustion engine chamber.

According to another embodiment, a process and system is described for providing an oxygen-enriched stream to at least one internal combustion engine chamber, comprising providing an oxygen-enriched stream (such as by using a PSA unit); recycling exhaust gas from an internal combustion engine chamber via a closed loop; mixing together the oxygen-enriched stream and the recycle exhaust gas to produce an engine chamber feed stream, wherein the oxygen-enriched stream is the only source of fresh oxygen in the engine chamber feed stream; and introducing the engine chamber feed stream into the internal combustion engine chamber.

A further disclosed internal combustion engine process and system involves providing an oxygen-enriched stream (such as by using a PSA unit); providing a first internal combustion engine chamber that produces a first engine exhaust stream; mixing together the oxygen-enriched stream and the first engine exhaust stream to produce a feed steam; and introducing the feed stream into a second internal combustion engine chamber.

An additional embodiment relates to a process for providing an oxygen-enriched stream to at least one internal combustion engine chamber, comprising introducing a first air stream into an internal combustion engine chamber having a displacement element (e.g., a piston or a rotor); introducing a second air stream into a pressure swing adsorption module to produce an oxygen-enriched stream and a nitrogen-enriched stream; introducing the oxygen-enriched stream into the internal combustion engine chamber during an expansion stroke of the displacement element; and introducing the nitrogen-enriched stream into the internal combustion engine chamber during an intake stroke of the displacement element.

DETAILED DESCRIPTION OF SEVERAL EMBODIMENTS

FIGS. 1–5

Figure 1:
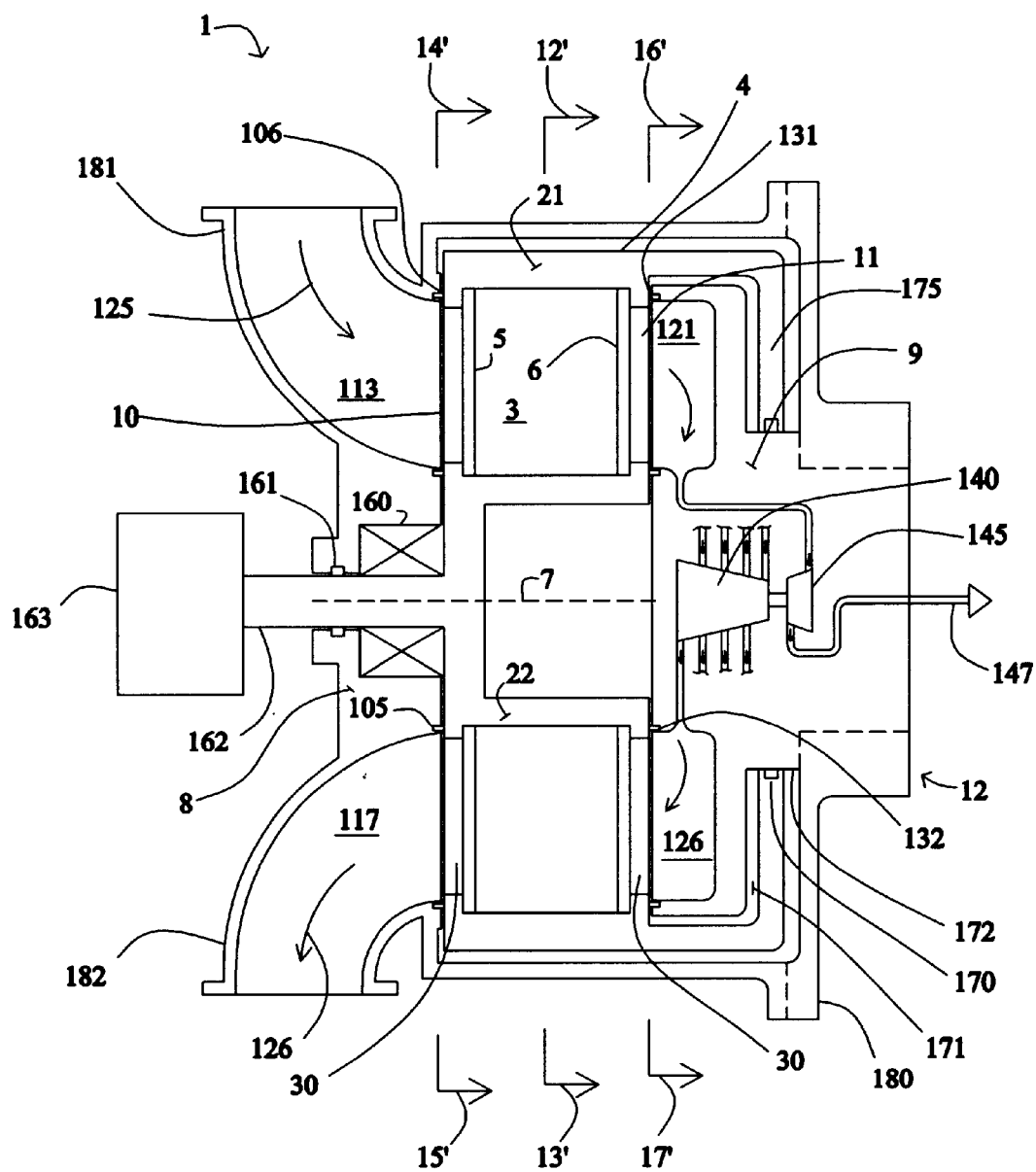
FIG. 1 shows an axial section of a rotary PSA module.

FIG. 1 shows one embodiment of a rotary PSA module 1, particularly suitable for smaller scale oxygen generation. Module 1 includes a number "N" of adsorbers 3 in adsorber housing body 4. Each adsorber has a first end 5 and a second end 6, with a flow path therebetween contacting a nitrogen-selective adsorbent if oxygen production is desired as the light gas. The adsorbers are arrayed about axis 7 of the adsorber housing body. The housing body 4 is in relative rotary motion about axis 7 with respect to the first and second functional bodies 8 and 9, the body 4 being engaged across a first valve face 10 with the first functional body 8 to which feed air is supplied and from which nitrogen-enriched air is withdrawn as the heavy product, and also engaged across a second valve face 11 with the second functional body 9 from which oxygen-enriched air is withdrawn as the light product.

In preferred embodiments as particularly depicted in FIGS. 1–5, the adsorber housing 4 rotates and shall henceforth be referred to as the adsorber rotor 4, while the first and second functional bodies are stationary and together constitute a stator assembly 12 of the module. The first functional body shall henceforth be referred to as the first valve stator 8, and the second functional body shall henceforth be referred to as the second valve stator 9. Alternatively, the first valve stator 8 and the second valve stator 9 could rotate and the adsorber housing 4 could remain stationary. As used herein, "rotary" pressure swing adsorption module includes, but is not limited to, either embodiment.

In the embodiment shown in FIGS. 1–5, the flow path through the adsorbers is parallel to axis 7, so that the flow direction is axial, while the first and second valve faces are shown as flat annular discs normal to axis 7. However, more generally the flow direction in the adsorbers may be axial or radial, and the first and second valve faces may be any figure of revolution centred on axis 7. The steps of the process and the functional compartments to be defined will be in the same angular relationship regardless of a radial or axial flow direction in the adsorbers.

FIGS. 2–5 are cross sections of module 1 in the planes defined by arrows 12'–13', 14'–15', and 16'–17'. Arrow 20 in each section shows the direction of rotation of the rotor 4.

Figure 2:
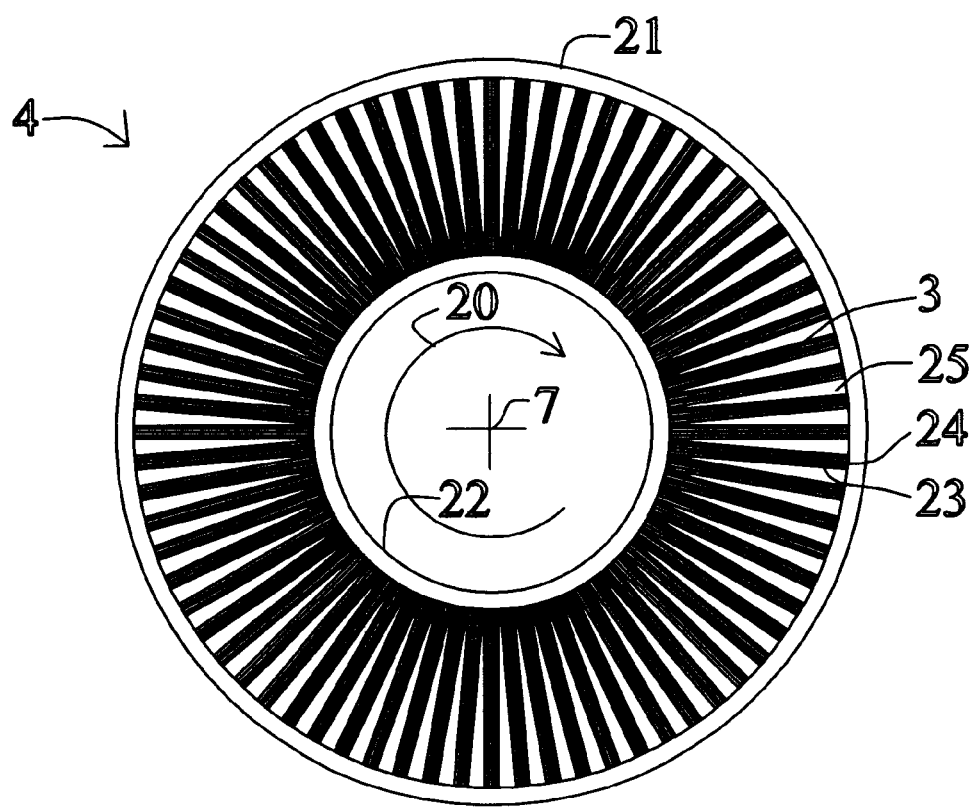
FIGS. 2 through 5B show transverse sections of the module of FIG. 1.

FIG. 2 shows section 12'–13' across the adsorber rotor in FIG. 1. Here, "N"=72. The adsorbers 3 are mounted between outer wall 21 and inner wall 22 of housing body or rotor 4. For described embodiments, each adsorber comprises a rectangular flat pack 3 of adsorbent sheets 23, with spacers 24 between the sheets to define flow channels here in the axial direction. Separators 25 are provided between the adsorbers to fill void space and prevent leakage between the adsorbers.

The adsorbent sheets comprise a reinforcement material, in preferred embodiments glass fibre, metal foil or wire mesh, to which the adsorbent material is applied, such as by attachment with a suitable binder. For air separation to produce enriched oxygen, typical adsorbents are X, A or chabazite-type zeolites, typically exchanged with lithium, calcium, strontium, magnesium and/or other cations, and with optimized silicon/aluminium ratios. The zeolite crystals are bound with silica, clay and other binders, or self-bound, within the adsorbent sheet matrix.

Satisfactory adsorbent sheets have been made by coating a slurry of zeolite crystals with binder constituents onto the reinforcement material, with successful examples including nonwoven fibreglass scrims, woven metal fabrics, and expanded aluminium foils. Spacers are provided by printing or embossing the adsorbent sheet with a raised pattern, or by placing a fabricated spacer between adjacent pairs of adsorbent sheets. Alternative satisfactory spacers have been provided as woven metal screens, non-woven fibreglass scrims, and metal foils with etched flow channels in a photolithographic pattern. Examples of methods and structures with packed, spirally wound adsorbents are disclosed in commonly-owned, co-pending U.S. Provisional Application No. 60/285,527, filed Apr. 20, 2001, and incorporated herein by reference.

Typical experimental sheet thicknesses have been 150 microns, with spacer heights in the range of 100 to 150 microns, and adsorber flow channel length approximately 20 cm. Using X type zeolites, excellent performance has been achieved in oxygen separation from air at relatively high PSA cycle frequencies of greater than about 10 cycles/minute, especially in the range of 30 to 150 cycles per minute.

Figure 3:
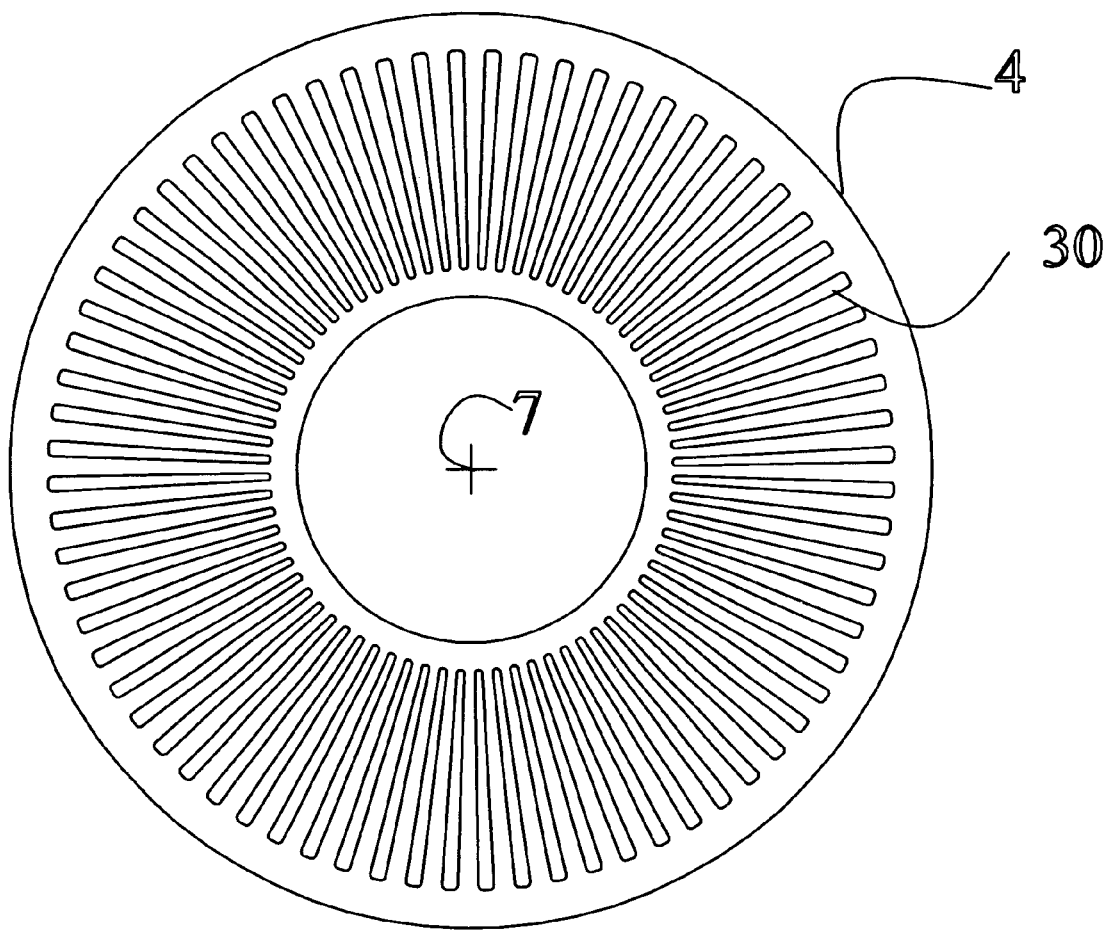

FIG. 3 shows the porting of rotor 4 in the first and second valve faces respectively in the planes defined by arrows 14'–15' and 16'–17'. An adsorber port 30 provides fluid communication directly from the first end 5 or second end 6 of each adsorber 3 to respectively the first or second valve face.

FIG. 4 shows the first stator valve face 100 of the first stator 8, in the first valve face 10, in the plane defined by arrows 14'–15'. Fluid connections are shown to a feed compressor 101 inducting feed air from inlet filter 102, and to an exhauster 103 delivering nitrogen-enriched second product to a second product delivery conduit 104. Compressor 101 and exhauster 103 are shown coupled to a drive motor 107.

Arrow 20 indicates the direction of rotation by the adsorber rotor. In the annular valve face between circumferential seals 105 and 106, the open area of first stator valve face 100 ported to the feed and exhaust compartments is indicated by clear angular segments 111–116 corresponding to the first functional ports communicating directly to functional compartments identified by the same reference numerals 111–116. The substantially closed area of valve face 100 between functional compartments is indicated by hatched sectors 118 and 119, which are slippers with zero clearance, or preferably a narrow clearance to reduce friction and wear without excessive leakage. Typical closed sector 118 provides a transition for an adsorber, between being open to compartment 114 and open to compartment 115. Gradual opening is provided by a tapering clearance channel between the slipper and the sealing face, so as to achieve gentle pressure equalization of an adsorber being opened to a new compartment. Much wider closed sectors (e.g. 119) are provided to substantially close flow to or from one end of the adsorbers when pressurization or blowdown is being performed from the other end.

The feed compressor provides feed air to feed pressurization compartments 111 and 112, and to feed production compartment 113. Compartments 111 and 112 have successively increasing working pressures, while compartment 113 is at the higher working pressure of the PSA cycle. Compressor 101 may thus be a multistage or split stream compressor system delivering the appropriate volume of feed flow to each compartment so as to achieve the pressurization of adsorbers through the intermediate pressure levels of compartments 111 and 112, and then the final pressurization and production through compartment 113. A split stream compressor system may be provided in series as a multistage compressor with interstage delivery ports; or as a plurality of compressors or compression cylinders in parallel, each delivering feed air to the working pressure of a compartment 111 to 113. Alternatively, compressor 101 may deliver all the feed air to the higher pressure, with throttling of some of that air to supply feed pressurization compartments 111 and 112 at their respective intermediate pressures.

Similarly, exhauster 103 exhausts nitrogen-enriched heavy product gas from countercurrent blowdown compartments 114 and 115 at the successively decreasing working pressures of those compartments, and finally from exhaust compartment 116 which is at the lower pressure of the cycle. Similarly to compressor 101, exhauster 103 may be provided as a multistage or split stream machine, with stages in series or in parallel to accept each flow at the appropriate intermediate pressure descending to the lower pressure.

Figure 4A:
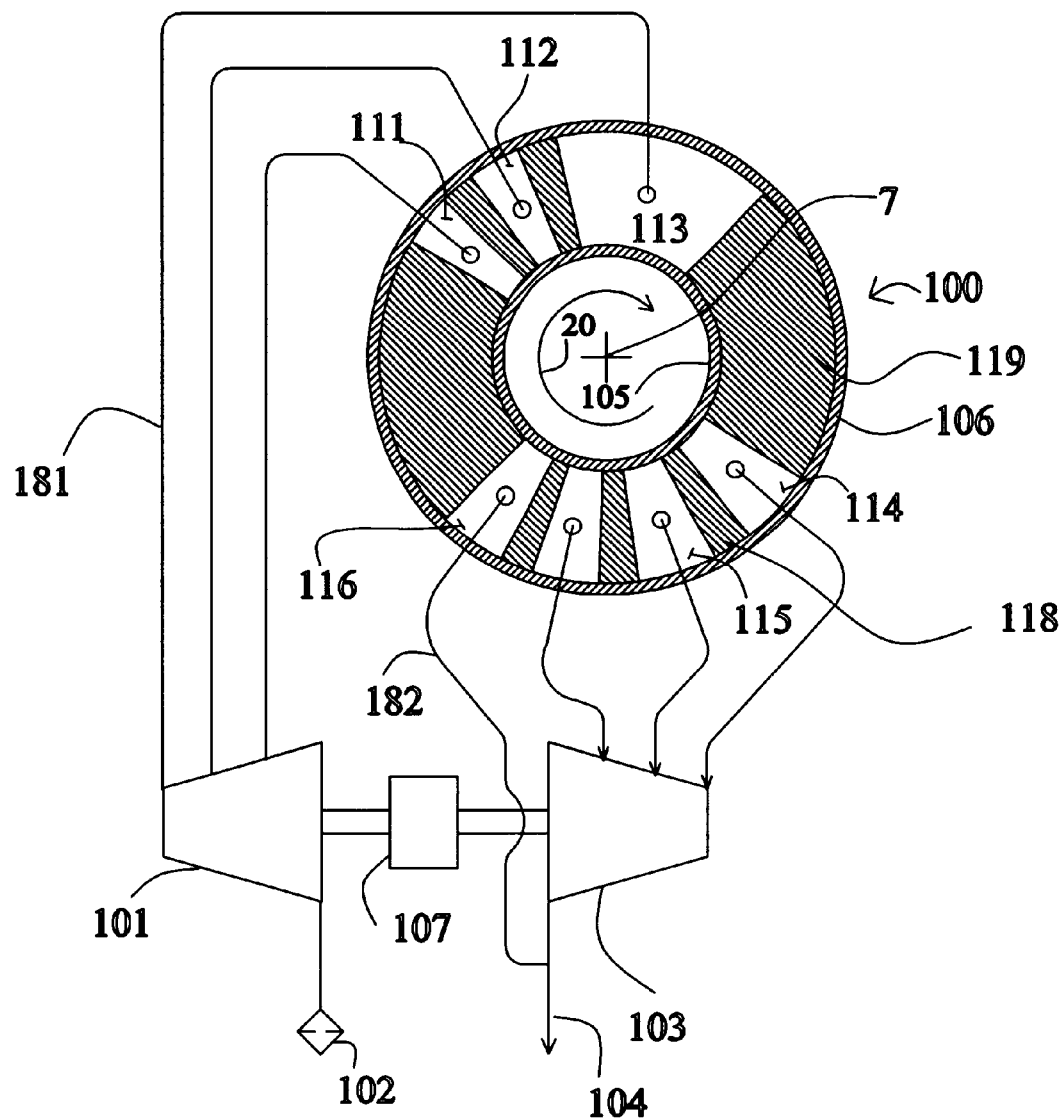

In the example embodiment of FIG. 4A, the lower pressure is ambient pressure, so exhaust compartment 116 exhausts directly to heavy product delivery conduit 104. Exhauster 103 thus provides pressure letdown with energy recovery to assist motor 107 from the countercurrent blowdown compartments 114 and 115. For simplicity, exhauster 103 may be replaced by throttling orifices as countercurrent blowdown pressure letdown means from compartments 114 and 115.

Figure 4B:
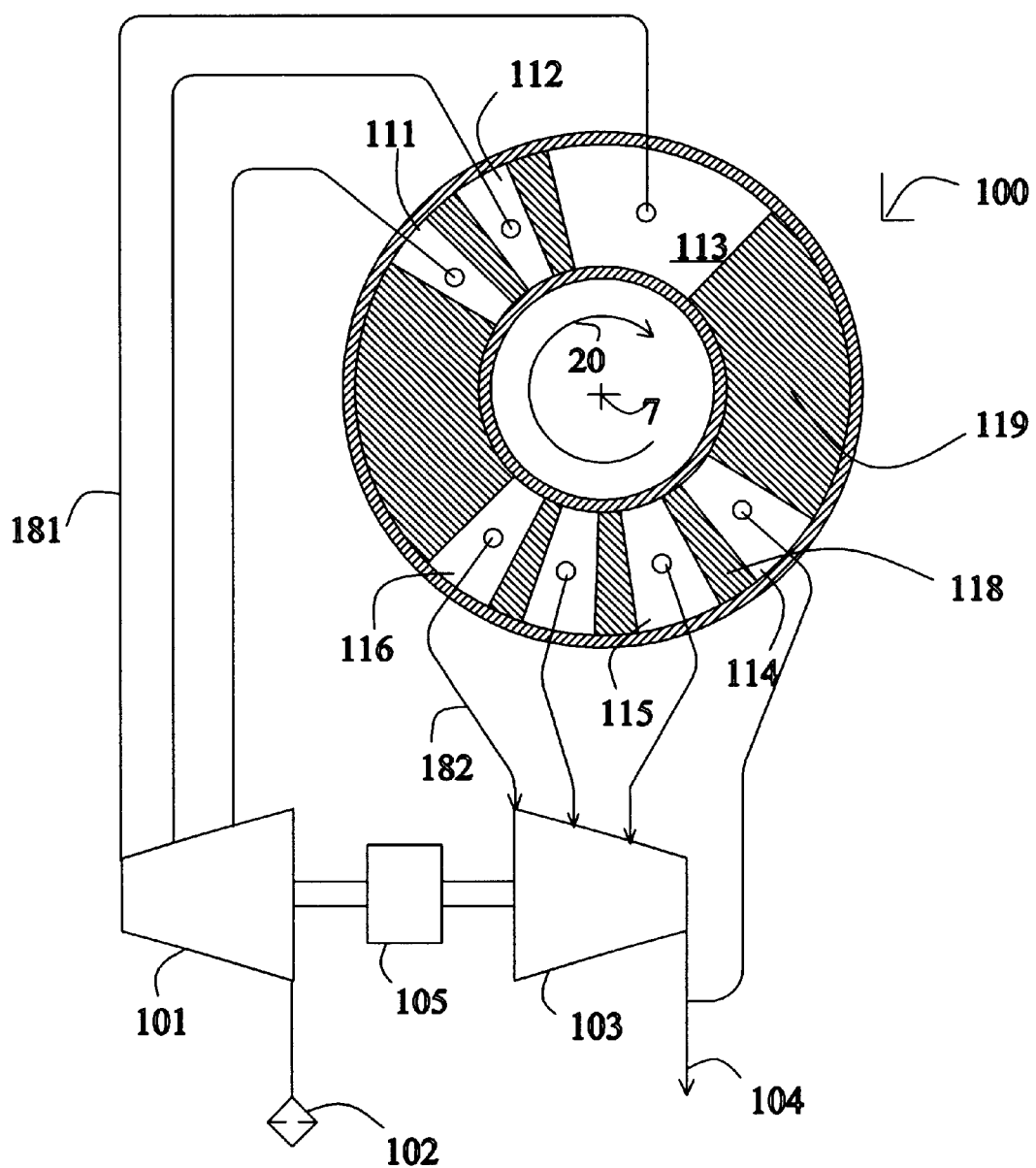

In some preferred embodiments, the lower pressure of the PSA cycle is subatmospheric. Exhauster 103 is then provided as a vacuum pump, as shown in FIG. 4B. Again, the vacuum pump may be multistage or split stream, with separate stages in series or in parallel, to accept countercurrent blowdown streams exiting their compartments at working pressures greater than the lower pressure which is the deepest vacuum pressure. In FIG. 4B, the early countercurrent blowdown stream from compartment 114 is released at ambient pressure directly to heavy product delivery conduit 104. If, for simplicity, a single stage vacuum pump were used, the countercurrent blowdown stream from compartment 115 would be throttled down to the lower pressure over an orifice to join the stream from compartment 116 at the inlet of the vacuum pump.

Figure 5A:
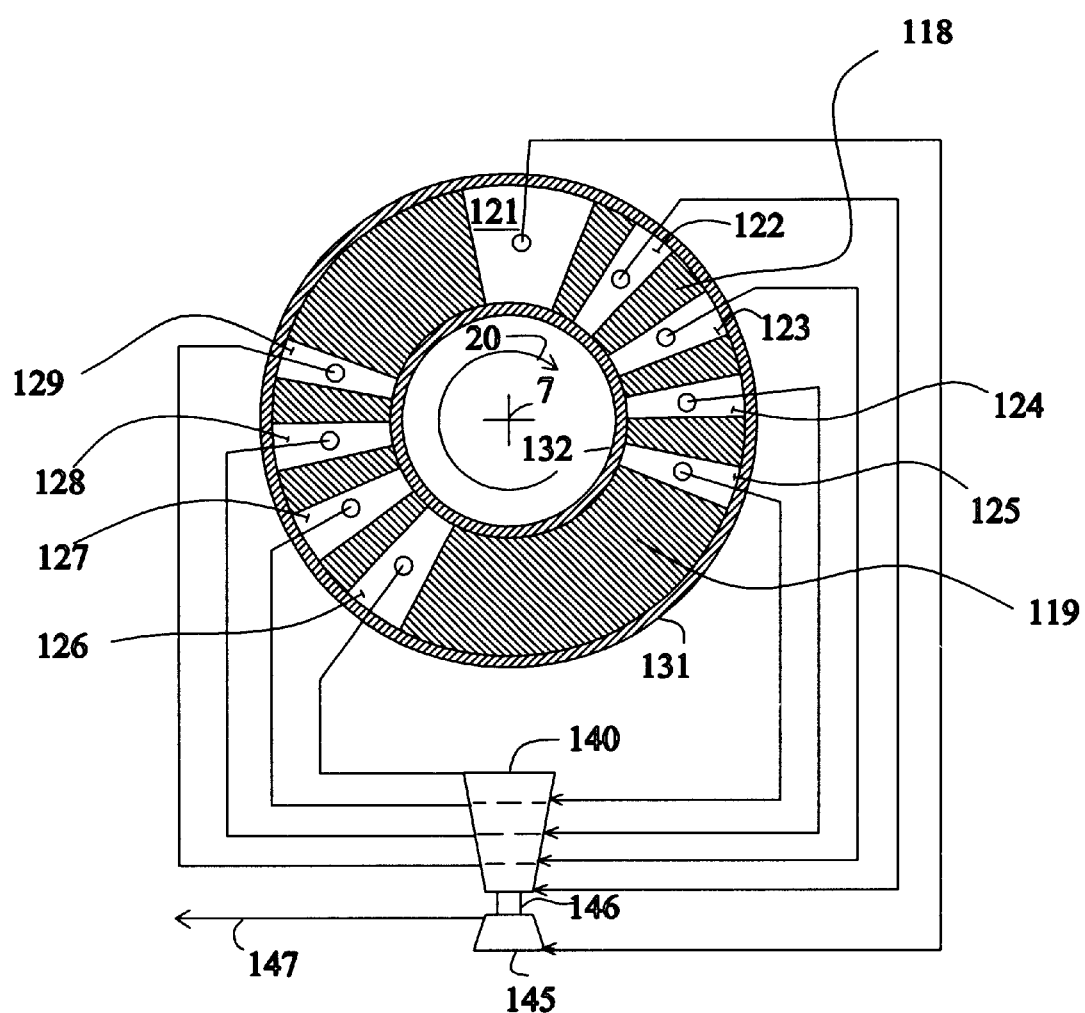
Figure 5B:
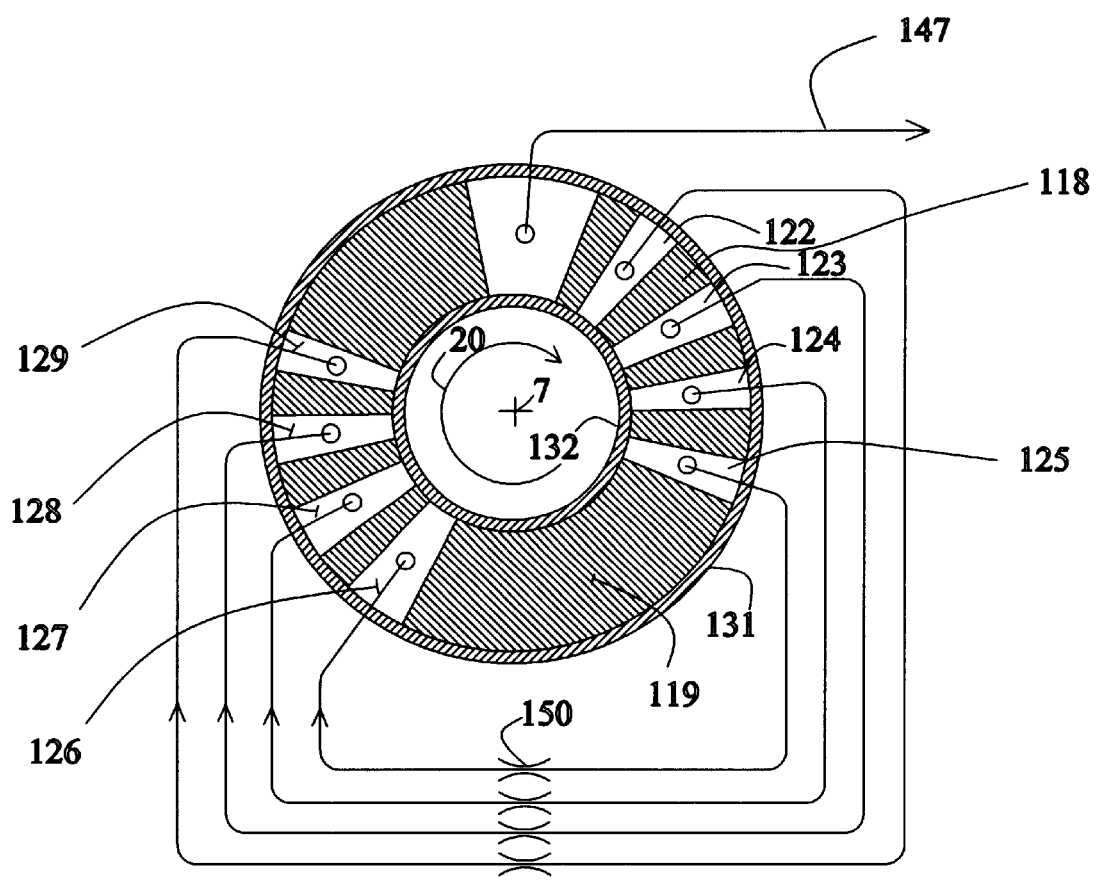

FIGS. 5A and 5B show the second stator valve face, taken along section lines 16'–17' of FIG. 1. Open ports of the valve face are second valve function ports communicating directly to a light product delivery compartment 121; a number of light reflux exit compartments 122, 123, 124 and 125; and the same number of light reflux return compartments 126, 127, 128 and 129 within the second stator. The second valve function ports are in the annular ring defined by circumferential seals 131 and 132. Each pair of light reflux exit and return compartments provides a stage of light reflux pressure letdown, respectively for the PSA process functions of supply to backfill, full or partial pressure equalization, and cocurrent blowdown to purge.

Illustrating the option of light reflux pressure letdown with energy recovery, a split stream light reflux expander 140 is shown in FIGS. 1 and 5A to provide pressure let-down of four light reflux stages with energy recovery. The light reflux expander 140 provides pressure let-down for each of four light reflux stages, respectively between light reflux exit and return compartments 122 and 129, 123 and 128, 124 and 127, and 125 and 126 as illustrated. The light reflux expander 140 may power a light product booster compressor 145 by drive shaft 146, which delivers the oxygen enriched light product to oxygen delivery conduit 147 compressed to a delivery pressure above the higher pressure of the PSA cycle. Illustrating the option of light reflux pressure letdown with energy recovery, a split stream light reflux expander 140 is provided to provide pressure letdown of four light reflux stages with energy recovery.

Light reflux expander 140 is coupled to a light product pressure booster compressor 145 by drive shaft 146. Compressor 145 receives the light product from compartment 121, and delivers light product (compressed to a delivery pressure above the higher pressure of the PSA cycle) to delivery conduit 147. Since the light reflux and light product are both enriched oxygen streams of approximately the same purity, expander 140 and light product compressor 145 may be hermetically enclosed in a single housing which conveniently may be integrated with the second stator as shown in FIG. 1. This configuration of a "turbo-compressor" oxygen booster without a separate drive motor is advantageous, as a useful pressure boost of the product oxygen can be achieved without an external motor and corresponding shaft seals, and can also be very compact when designed to operate at very high shaft speeds.

FIG. 5B shows the simpler alternative of using a throttle orifice 150 as the pressure letdown means for each of the light reflux stages.

Turning back to FIG. 1, compressed feed air is supplied to compartment 113 as indicated by arrow 125, while nitrogen enriched heavy product is exhausted from compartment 117 as indicated by arrow 126. The rotor is supported by bearing 160 with shaft seal 161 on rotor drive shaft 162 in the first stator 8, which is integrally assembled with the first and second valve stators. The adsorber rotor is driven by motor 163.

As leakage across outer circumferential seal 131 on the second valve face 11 may compromise enriched oxygen purity, and more importantly may allow ingress of atmospheric humidity into the second ends of the adsorbers which could deactivate the nitrogen-selective adsorbent, a buffer seal 170 is provided to provide more positive sealing of a buffer chamber 171 between seals 131 and 171. Even though the working pressure in some zones of the second valve face may be subatmospheric (in the case that a vacuum pump is used as exhauster 103), the buffer chamber 171 is filled with dry enriched oxygen product at a buffer pressure positively above ambient pressure. Hence, minor leakage of dry oxygen outward may take place, but humid air may not leak into the buffer chamber. In order to further minimize leakage and to reduce seal frictional torque, buffer seal 171 seals on a sealing face 172 at a much smaller diameter than the diameter of circumferential seal 131. Buffer seal 170 seals between a rotor extension 175 of adsorber rotor 4 and the sealing face 172 on the second valve stator 9, with rotor extension 175 enveloping the rear portion of second valve stator 9 to form buffer chamber 171. A stator housing member 180 is provided as structural connection between first valve stator 8 and second valve stator 9. Direct porting of adsorbers to the stator face is an alternative to providing such seals and is described in commonly-owned, co-pending U.S. Provisional Application No. 60/301,723, filed Jun. 28, 2001, and incorporated herein by reference.

In the following system figures of this disclosure, simplified diagrams will represent a PSA apparatus or module.

These highly simplified diagrams will indicate just a single feed conduit 181 to, and a single heavy product conduit 182 from, the first valve face 10; and the light product delivery conduit 147 and a single representative light reflux stage 184 with pressure let-down means communicating to the second valve face 11. It should be recognized that any type of gas separation device could be substituted for the PSA, including other types of adsorption modules or gas membrane separation systems.

FIG. 6

Figure 6:
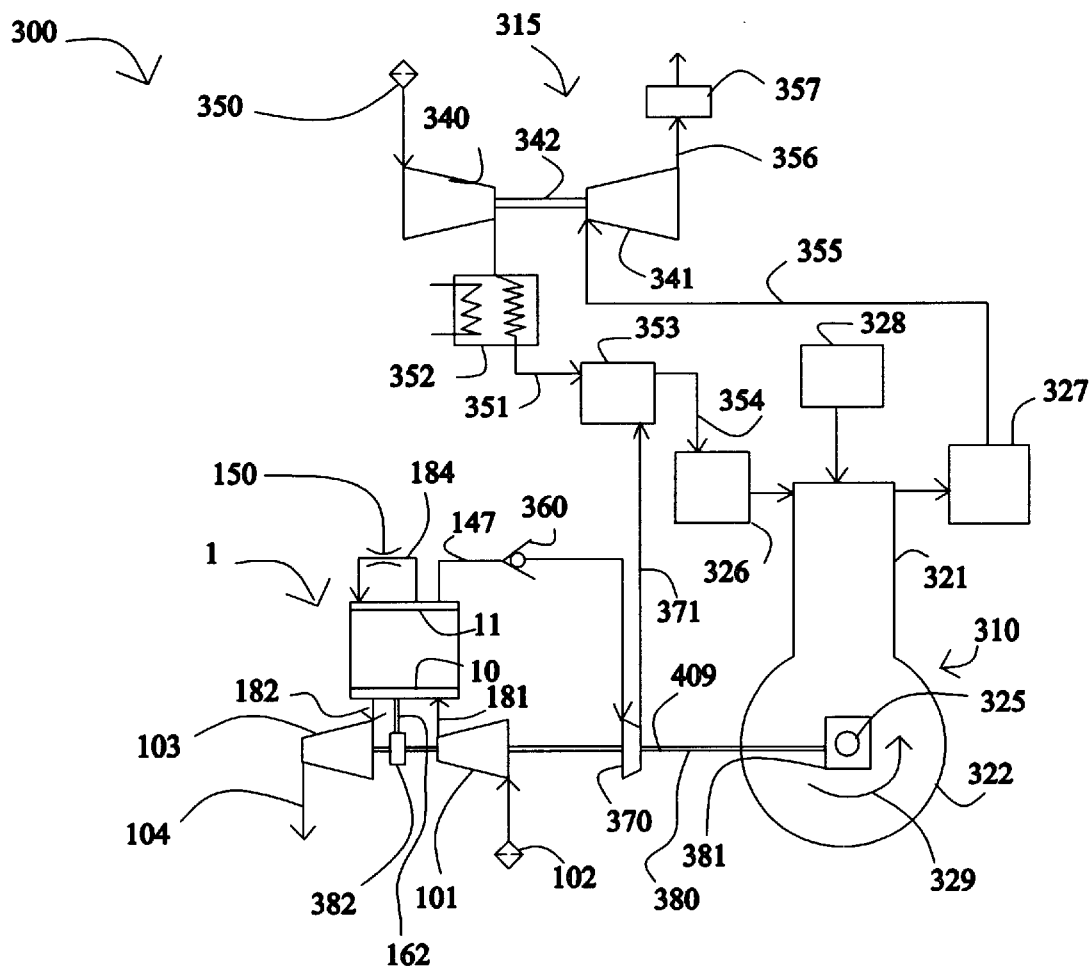
FIG. 6 shows a vacuum PSA unit applied to oxygen enrichment for a turbo-charged diesel engine.

FIG. 6 shows an internal combustion engine power plant 300 including an internal combustion engine 310, a turbocharger 315 and a vacuum PSA module for oxygen enrichment of the air supply to the engine. The engine 310 is shown as a section across an engine cylinder 321, crankcase 322 and crankshaft 325. The engine has an intake manifold 326 and an exhaust manifold 327 respectively communicating by valves (not shown) or more generally by means of opening and closing the respective manifolds to the cylinder 321. The opening and closing means could be valves or alternatively ports which are sequentially uncovered and covered by a reciprocating piston in the cylinder 321. In the particular case that the engine is a diesel or compression ignition engine, a fuel injector 328 is provided for each cylinder 321. In the alternative case that the engine is a spark ignition engine, fuel may be injected to each cylinder or alternatively may be supplied already mixed with the feed air to the intake manifold by a carburetor. Illustrative fuels includes gaseous fuels such as hydrogen, natural gas (or methane), methanol, ethanol, biomass gas, or landfill gas, or a liquid hydrocarbon such as gasoline or diesel fuel, or perhaps combinations of such fuels. Fuel may also be supplied to the intake manifold 326 or port by a fuel injector 328 or a multiplicity of fuel injectors. The direction of rotation of crankshaft 325 is shown by arrow 329.

The engine 310 of FIG. 6 is illustrated as turbocharged by a turbocharger 315, including a compressor 340 driven by expander 341 through shaft 342. Alternatively, the engine may be supercharged by a blower 340 driven electrically or mechanically by the engine, or else may be naturally aspirated. Compressor or blower 340 receives ambient air from an air filter 350, and delivers compressed air through conduit 351 and an optional intercooler 352 to a mixing chamber 353 communicating by conduit 354 to intake manifold 326. The engine exhaust is delivered from exhaust manifold 327 by conduit 355 to expander 341, and thence after expansion to exhaust conduit 356 and exhaust after-treatment system 357 and thence to the atmosphere. Exhaust after-treatment may include a catalytic converter, perhaps assisted by a device (e.g. corona discharge or non-thermal plasma) for further reduction of NOx.

Air is also fed to the PSA module 1 by a blower 101 drawing air though an air filter 102. Nitrogen-enriched air is withdrawn from the PSA module 1 by a vacuum pump 103, and is discharged by conduit 104 either as a useful byproduct or else as waste. The PSA module has throttle orifices 150 as pressure-letdown means for a light reflux stage 184. Oxygen-enriched light product is delivered by conduit 147 and non-return valve 360 at a pressure slightly less than the higher pressure of the PSA cycle generated by blower 101.

An oxygen booster compressor 370 may be provided if required to boost the pressure of the enriched oxygen stream to the intake manifold pressure, and the compressed stream of enriched oxygen is delivered by conduit 371 to mixing chamber 353 communicating by conduit 354 to intake manifold 326.

Some of the power developed by the diesel engine may be utilized to rotate the PSA adsorber rotor through shaft 162, and to drive feed blower 101, vacuum pump 103 and oxygen booster compressor 370. These auxiliary mechanical loads may be powered electrically or by mechanical power take-offs. FIG. 6 schematically indicates these options by showing all these loads driven by a shaft 380, in turn driven by power takeoff 381 coupled to crankshaft 325, and with a gearbox 382 driving the PSA rotor drive shaft 162.

In another mode of operation, a portion of the exhaust gas in conduit 355 may be diverted by an Exhaust Gas Recirculation (EGR) valve (not shown) to conduit 351 and cooler 352, and then mixed with enriched oxygen in chamber 353. EGR is a well known technique for diluting oxygen in the combustion chamber so as to reduce peak temperature and NOx formation.

In a limiting case of extreme EGR, intake of air by compressor 340 may be eliminated so that the engine runs entirely on recycled exhaust gas plus enriched oxygen delivered by PSA unit 1. In other words, enriched oxygen delivered by the PSA unit 1 is the only source of fresh or additional oxygen for the engine feed stream. Cooler 352 would be adapted to condense and remove excess water of combustion. If the PSA unit is operated at maximum delivered oxygen purity, the product oxygen will contain approximately 95% oxygen plus 5% argon and minimal nitrogen (e.g., less than about 5% nitrogen). The engine working fluid will then mainly comprise accumulated argon and carbon dioxide. Argon has a higher specific heat ratio than nitrogen, and consequently is a superior thermodynamic working fluid. The substantial elimination of atmospheric nitrogen reduces NOx generation to correspondingly low levels, while oxygen levels in the combustion chamber may be maintained high enough to suppress particulate formation. Potential disadvantages may include the need for a large capacity oxygen PSA unit to deliver all of the oxygen required for combustion at high purity, the parasitic power consumption of oxygen enrichment, the larger exhaust heat cooling load in cooler 352, and corrosion issues from EGR. However, this approach substantially overcomes the emissions problems of internal combustion engines.

The gas components and concentrations of the fluid in conduit 355 will vary according to the particular type of fuel, and the efficiencies of the PSA unit and the internal combustion engine. According to particular embodiments of extreme EGR (assuming complete combustion of $O_2$), if the fuel is hydrogen and the PSA unit is achieving approximately 95% oxygen, the engine working fluid in conduit 355 will be argon plus uncondensed water vapor. If the PSA unit is achieving approximately 90% oxygen, the dry composition of the gas in conduit 355 would be about 50% argon and about 50% nitrogen. If the fuel is methane (i.e., natural gas) and the PSA unit provides approximately 95% oxygen, the dry composition of the engine working fluid in conduit 355 will be about 91% $CO_2$ and about 9% argon. If the PSA unit is achieving approximately 90% oxygen, the dry composition of the gas in conduit 355 would be about 83% $CO_2$, about 8.5% nitrogen, and about 8.5% argon. If the fuel is gasoline or diesel fuel and the PSA unit is achieving approximately 95% oxygen, the dry composition of the gas in conduit 355 would be about 93% $CO_2$ and about 7% argon. If the PSA unit is achieving approximately 90% oxygen, the dry composition of the gas in conduit 355 would be about 87% $CO_2$, about 6.5% nitrogen, and about 6.5% argon.

FIG. 7

Figure 7:
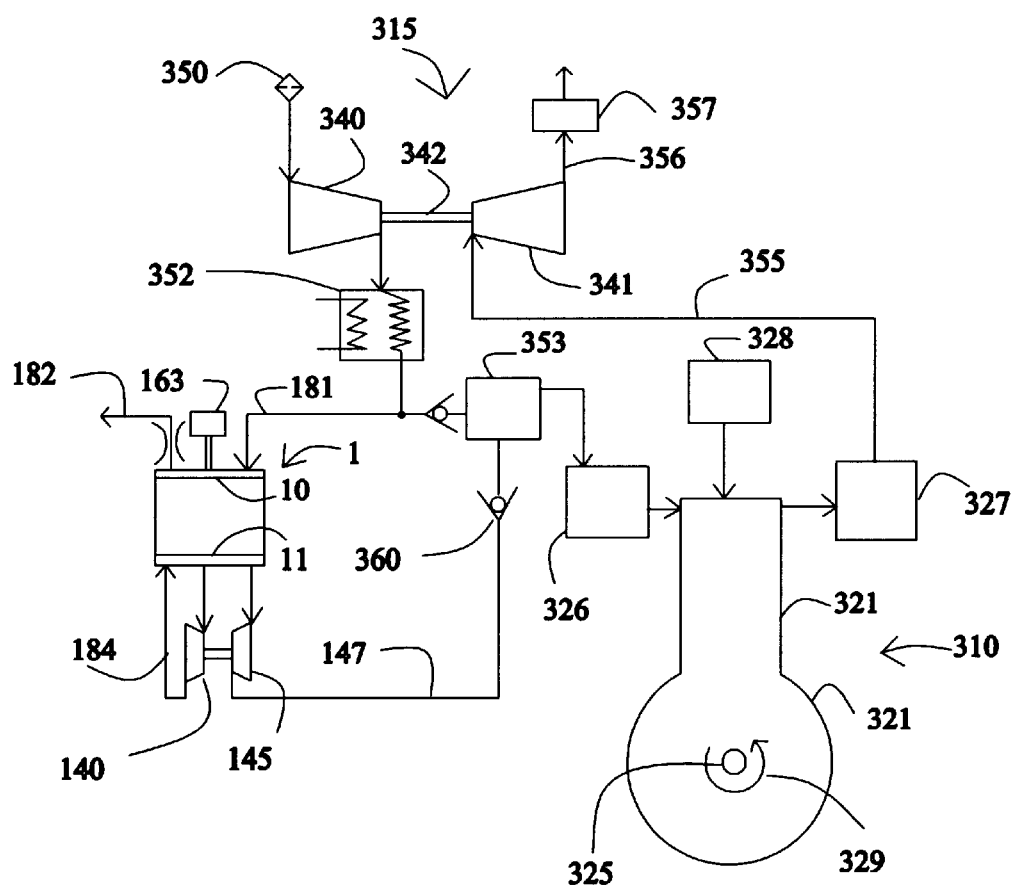
FIG. 7 shows a positive pressure PSA unit applied to oxygen enrichment for a diesel engine with energy recovery from the light reflux in order to boost the oxygen product pressure.

FIG. 7 shows a positive pressure PSA unit 1 applied to oxygen enrichment for a turbocharged diesel engine 310 with energy recovery from the light reflux in order to boost the oxygen product pressure. Here, the turbocharger compressor 340 and intercooler 352 supply compressed and cooled feed air both to the mixing chamber 353 and to the PSA feed conduit 181. No vacuum pump or exhauster 103 is provided in this example, so instead a throttle orifice provides pressure letdown of nitrogen-enriched blowdown gas discharged as waste by conduit 182.

The enriched oxygen product is generated at a total pressure slightly less than the air feed pressure to the mixing chamber 353, so in this embodiment energy recovery from light reflux pressure letdown is used to boost the oxygen product pressure as required. Light reflux expander 140 (on at least one light reflux stage 184) directly powers oxygen booster compressor 145 in an oxygen turbocharger configuration.

FIG. 8

Figure 8:
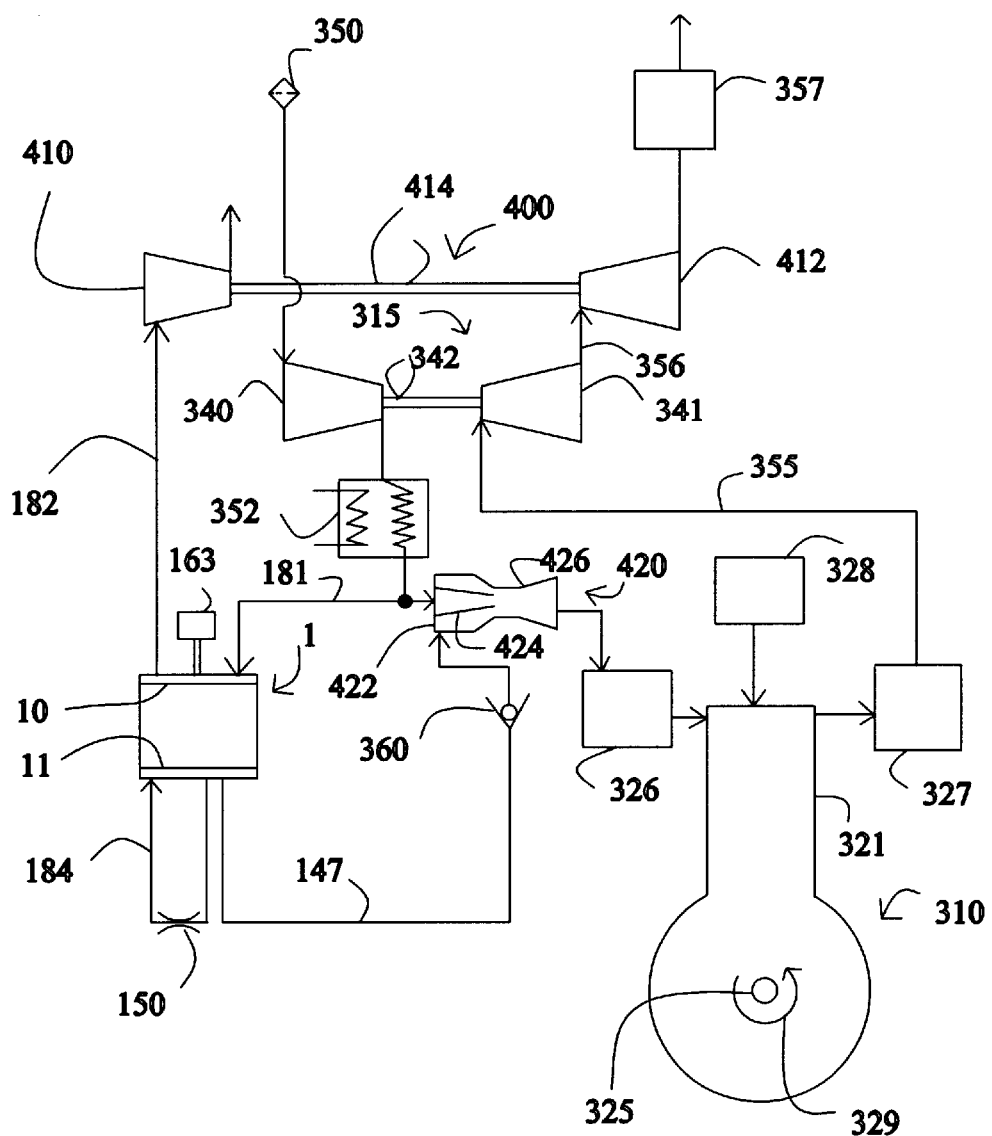
FIG. 8 shows a vacuum PSA unit to provide an oxygen-enriched stream for a diesel engine with an ejector to boost the oxygen product pressure and a turbocharger as the vacuum pump.

FIG. 8 shows a vacuum PSA unit 1 applied to oxygen enrichment for a diesel engine 310 with an ejector 420 to boost the oxygen product pressure and a "turboexhauster" 400 (similar to a conventional turbocharger) as the vacuum pump.

FIG. 8 is similar to FIG. 7, but without energy recovery on the light reflux. It is a vacuum PSA system, using a turboexhauster 400 as the vacuum pump. Turboexhauster 400 includes a vacuum pump 410 driven by expander turbine 412 through shaft 414. Vacuum pump 410 may be a centrifugal or radial compressor, while turbine 412 may be a radial inflow turbine. Nitrogen enriched exhaust recompressed by vacuum pump 410 is exhausted to atmosphere or delivered as a by-product. Both the feed turbocharger 315 and the turboexhauster 400 are powered by the engine exhaust. FIG. 8 shows a two-stage expansion process utilizing turbines 341 and 412 in series. Alternatively, turbines 341 and 412 may be connected in series to perform a single stage expansion of the appropriately divided exhaust flow.

Ejector 420 is provided for mixing enriched oxygen from conduit 147 with feed air from compressor 340 at a common pressure, with a pressure boost of the enriched oxygen to overcome pressure drop in the PSA module 1. The light product enriched oxygen is directed by conduit 147 through non-return valve 360 to suction port 422 of ejector 420. The remaining portion of the feed gas stream is introduced by nozzle 424 to entrain the enriched oxygen from port 422 into a mixed stream for pressure recovery in diffuser 426 to the correct intake pressure to the diesel engine 310. Fuel is injected into the cylinder 321 through injector 328.

FIG. 9

Figure 9:
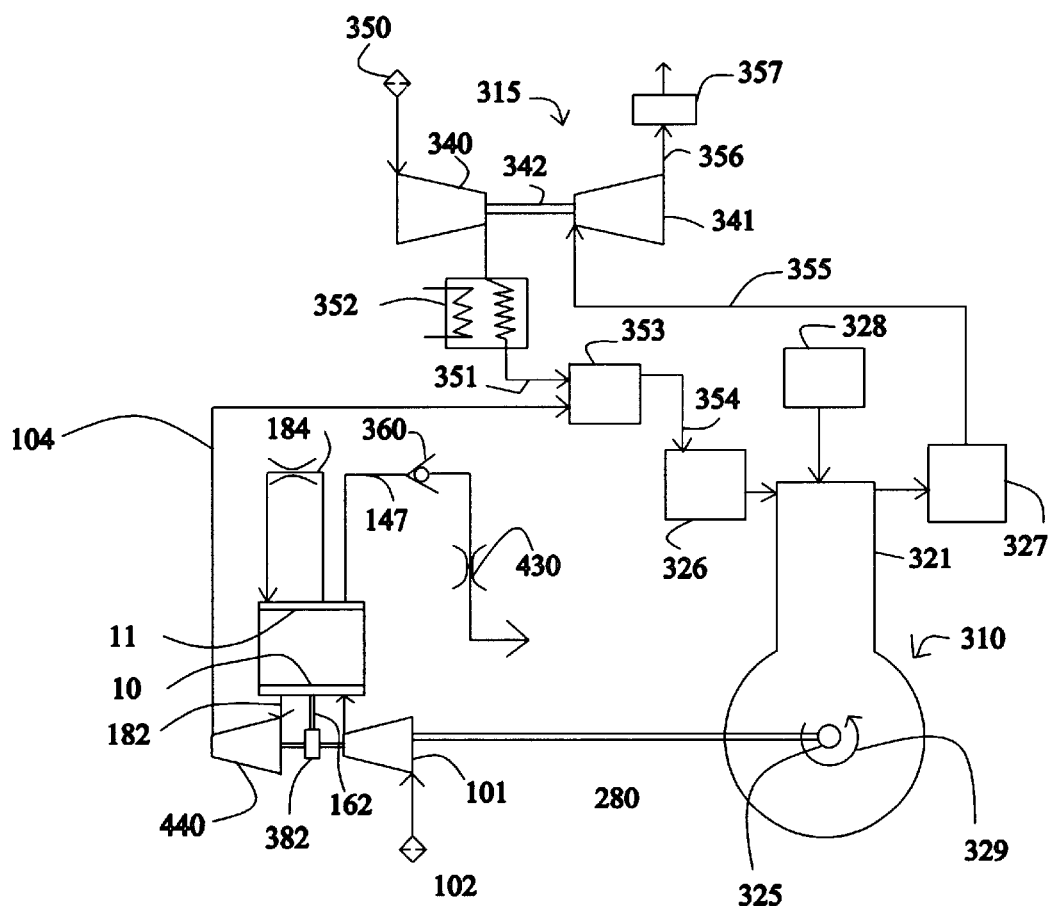
FIG. 9 shows a PSA unit applied to nitrogen enrichment for a turbocharged diesel engine.

FIG. 9 shows a PSA unit 1 applied to nitrogen enrichment for a turbocharged diesel engine 310, in order to reduce NOx emissions and as an alternative or supplement to EGR. The oxygen enriched light product stream is in this case a by-product or waste product. A control valve 430 is provided to maintain back pressure in conduit 147 as the light product stream is delivered. The nitrogen-enriched heavy product is compressed by heavy product compressor 440 into conduit 104 up to the intake manifold pressure to be blended with incoming feed air in mixing chamber 353. Heavy product compressor 440 may induct the heavy product from conduit 182 at any suitable lower pressure of the PSA cycle, which may be a subatmospheric pressure. As in preceding embodiments, the feed atmospheric air to the engine 310 and to the PSA 1 is pressurized by turbocharger 315, powered by engine exhaust energy. After mixing in chamber 353, the combined air stream is slightly nitrogen enriched, resulting in a typical oxygen concentration of 19% or 20% rather than the ambient 21%.

FIG. 10

Figure 10:
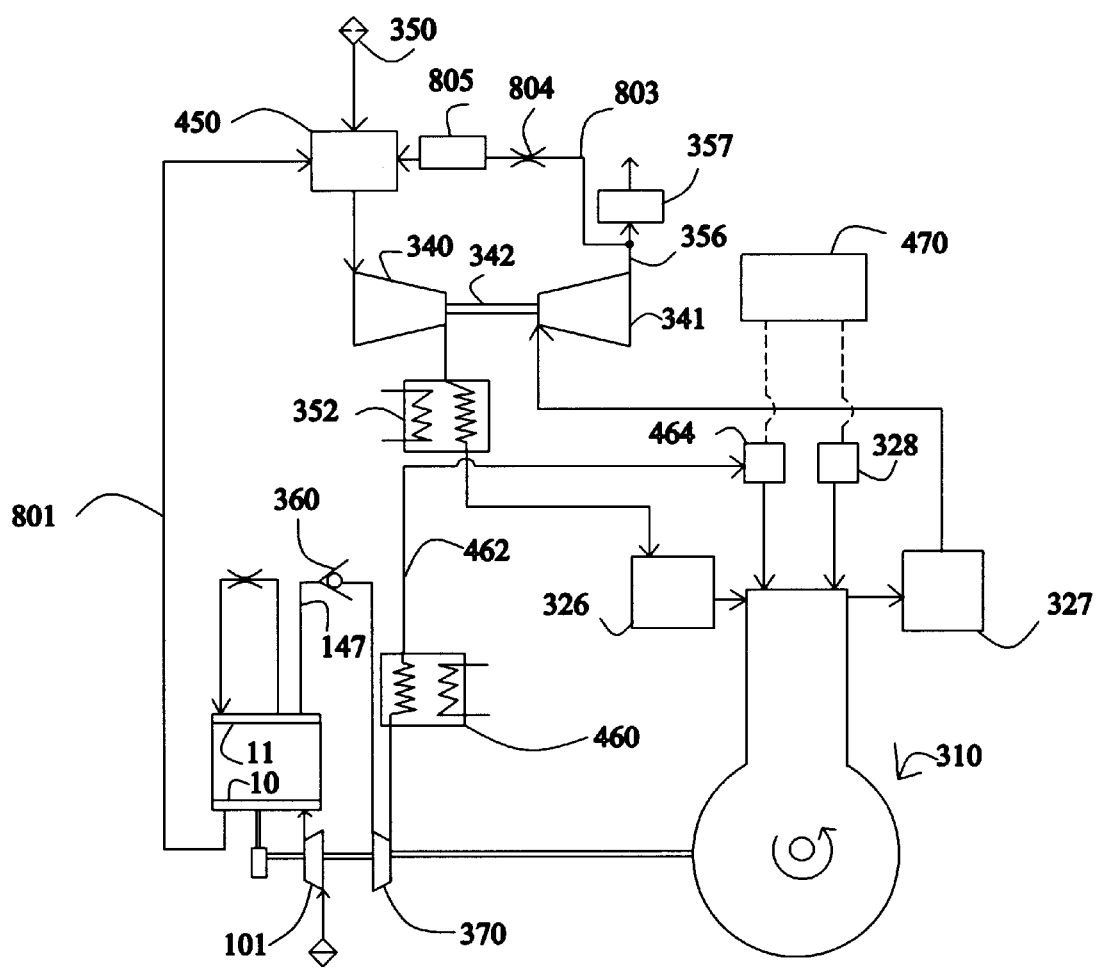
FIG. 10 shows a PSA unit applied to nitrogen enrichment for a turbocharged diesel engine, while oxygen-enriched product is compressed and injected late in the expansion cycle into the engine at an increased pressure.
Figure 11:
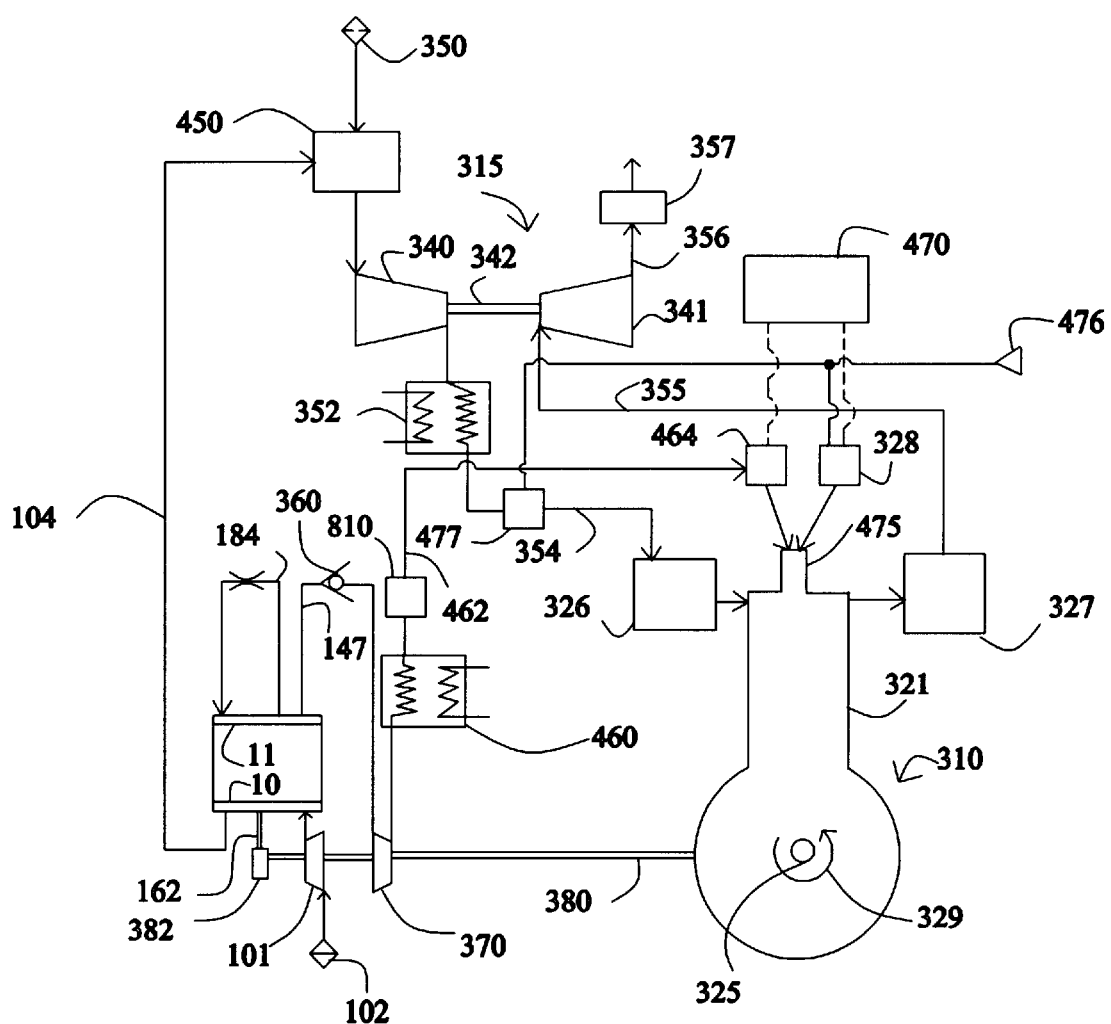
FIG. 11 shows a PSA unit applied to oxygen enrichment for a turbocharged diesel engine with the enriched oxygen blended into the feed air upstream of the turbocharger and the PSA unit.

FIG. 10 shows a PSA unit 1 applied to modest nitrogen enrichment for a turbocharged diesel engine 310 for reduced NOx, while the oxygen enriched product is compressed to a high pressure as required for injection into the cylinder 321 late in the expansion phase to enhance final combustion of the fuel toward completion.

Nitrogen enriched heavy product exhausted from the PSA is delivered by conduit 801 to intake mixing chamber 450, and is there mixed with atmospheric air.

A fraction of exhaust gas may be recycled to intake mixing chamber 450 from exhaust conduit 356 by an EGR conduit 803 including an EGR control valve 804 and an EGR cooler 805. The mixed stream at modest nitrogen enrichment is then compressed by turbocharger compressor 340 and cooled prior to being directed to the intake manifold 326. The addition of PSA nitrogen-enriched air provided to chamber 450 reduces the amount of EGR, thus alleviating the cooling load in cooler 805 as well as engine system corrosion and abrasion problems associated with EGR. Conversely, the necessary capacity and parasitic power demand of the PSA unit is reduced if some EGR is also provided.

Atmospheric air is compressed by feed blower 101 prior to entry as feed gas to the PSA unit. First and second valve means 10 and 11 respectively operate the PSA cycle. Light product oxygen 147 (at a relatively high purity of e.g. 90% $O_2$) from the PSA is compressed by compressor 370 to a suitable high pressure, typically well in excess of the highest engine working pressure within the cylinder 321, as required for rapid and efficient injection. The compressed oxygen from compressor 370 may be cooled by intercooler 460 in conduit 462 communicating to oxygen injector 464. The oxygen is injected into cylinder 321 late in the expansion cycle so as to enhance final combustion of fuel already injected into the engine by fuel injector 328. Electronic control unit 470 controls the injection timing of oxygen and fuel into the cylinder, coordinated with the piston reciprocation.

Combustion occurs during the expansion stroke of the piston or rotor. Enriched oxygen produced by the PSA unit is added to the combustion chamber during this expansion stroke. Adding oxygen at this time helps oxidize particulate matter without increasing NOx. An exhaust valve opens, exhausting the combustion chamber during the exhaust stroke. During the intake stroke, an intake mixture of air and enriched nitrogen produced by the PSA is added to the combustion chamber. In the compression stroke of the piston or rotor, the pressure increases to a point that hot fuel contacting oxygen within the chamber ignites. Combustion of the fuel, which is injected into the nitrogen enriched intake mixture (delivered from mixing chamber 450 to intake manifold 326), ensues into the expansion stroke of the piston. At a user controlled crank angle in the expansion stroke, the oxygen produced by the PSA unit is introduced to the combustion chamber. If injected at the correct time and with appropriate energy/momentum, the additional oxygen will enhance combustion mixing, thus enhancing particulate oxidation without increasing nitrogen oxide formation. The exhaust process then proceeds in the usual manner for the engine, followed by intake of nitrogen enriched air as in the previous cycle, and the processes are cyclically repeated. It will be evident that the strategy of late injection of highly enriched oxygen may be applied whether or not the nitrogen enriched stream is blended with feed air as illustrated in FIG. 10, or alternatively discarded as a separate byproduct or waste stream. Combination of some EGR to augment the PSA contribution to nitrogen enrichment of the intake air may be desirable if the PSA unit is sized as small as possible to supply the desired oxygen flow for supplemental late injection. Also, it will be noted that such a high level of oxygen enrichment as required for viable late injection can readily be achieved by the described PSA systems, but could not be achieved by a membrane permeation device, which could only with difficulty approach permeate oxygen concentrations much above 30%.

According to another embodiment (that may or may not include EGR), the oxygen-enriched stream is injected so as to participate in early combustion. The compressed oxygen-enriched stream from compressor 370 is injected through injector 464, injected through a dual injector (i.e., a combination of injectors 464 and 328 into a single device), or the oxygen-enriched stream is mixed with the fuel and injected through injector 328. Adding enriched oxygen early in the combustion process reduces soot formation in the combustion zone. Early introduction of the oxygen-enriched stream can be combined with nitrogen enrichment of the intake air, thus simultaneously decreasing the formation of NOx.

FIG. 11

An alternative use of highly enriched and compressed oxygen would be for oxygen enriched precombustion of a small fraction of the fuel in a precombustion (i.e., initial combustion) chamber or "prechamber" 475 communicating with the cylinder 321, wherein the balance of the fuel may be combusted under highly lean conditions so as to minimize NOx. Here, the fuel supply conduit 476 admits a primary fuel stream to a carburetor (or mixing chamber) 477 in air feed conduit 354 to intake manifold 326, and also delivers a secondary fuel stream to fuel injector 328 which injects fuel into the precombustion chamber 475. Oxygen injector 464 also delivers enriched and compressed oxygen from conduit 462, preferably in approximate stoichiometry or on the fuel rich side with respect to the secondary fuel stream, into the precombustion chamber. A combined injector for fuel and oxygen may be employed. For example, prior to introducing the fuel into the engine chamber, the fuel may be mixed with the oxygen-enriched stream under conditions sufficient to dissolve the oxygen into the fuel, form a miscible fuel/oxygen mixture, or form a fuel/oxygen dispersion. In the case of liquid fuel, the mixing may occur under pressurized conditions. The fuel stream and the oxygen-enriched stream could each be under sufficient pressure prior to mixing or sufficient pressure could be applied to the fuel/oxygen-enriched stream mixture after it is formed. The high level of oxygen enrichment and appropriate timing of injection facilitates compression ignition within the precombustion chamber, in turn providing an intense high temperature jet from the precombustion chamber into the main combustion chamber of cylinder to create strong mixing and vigorous ignition of the lean fuel/air mixture therein. Spark ignition may not be needed. This would be particularly advantageous where natural gas is the fuel, so that pilot ignition by diesel fuel might be eliminated in a compression ignition engine.

In general, the compact and highly efficient air separation system of the present invention may be applied to stratified combustion systems so that enriched oxygen may be injected with fuel under relatively rich conditions in an ignition zone within a combustion chamber generally under relatively lean conditions, in order to achieve more nearly complete fuel combustion, low NOx emission, favorable power density and low specific fuel consumption. In the above example, a precombustion chamber defines an ignition zone with desired separation (that could also be achieved by stratification) between the ignition zone and the main combustion chamber.

According to certain embodiments, the overall (i.e., total gas mass balance in the zone of interest) equivalence ratio (i.e., the ratio of fuel/oxygen (actual) to fuel/oxygen (stoichiometric equivalent) in the primary combustion chamber can range from about 0.2 to about 1.0, particularly about 0.4 to about 1.0. The overall equivalence ratio in the precombustion chamber may range from about 1.0 to about 4.0.

The following approaches apply to early introduction or injection of oxygen into an ignition zone (e.g. a prechamber or a stratified layer) to initiate ignition or to assist initiation of ignition. In one approach, a lean homogeneous fuel/air mixture in the main combustion chamber (perhaps with nitrogen enriched air also in the main combustion chamber) is ignited with assistance of enriched oxygen injection into the ignition zone. In another approach, the lean homogeneous fuel/air mixture is ignited by injection of oxygen and fuel (together or separately) into the ignition zone. In yet another approach, a portion of the oxygen injected into the ignition zone is converted into highly reactive ozone by a corona discharge ozone generator 810 upstream of oxygen injector 464. In all of these approaches, the fuel may be a difficultly ignited fuel such as natural gas.

Combination of the PSA oxygen enrichment process with a corona discharge ozone generator is advantageous, as energetic efficiency and productivity of ozone generation is doubled with 90% concentration oxygen relative to atmospheric air. The PSA unit also removes atmospheric humidity as required by the corona discharge process. A small concentration of ozone in enriched oxygen injected at or about the end of the compression stroke will positively initiate ignition, potentially enabling the elimination of spark ignition that may otherwise be necessary to ignite a given fuel.

FIG. 12

Figure 12:
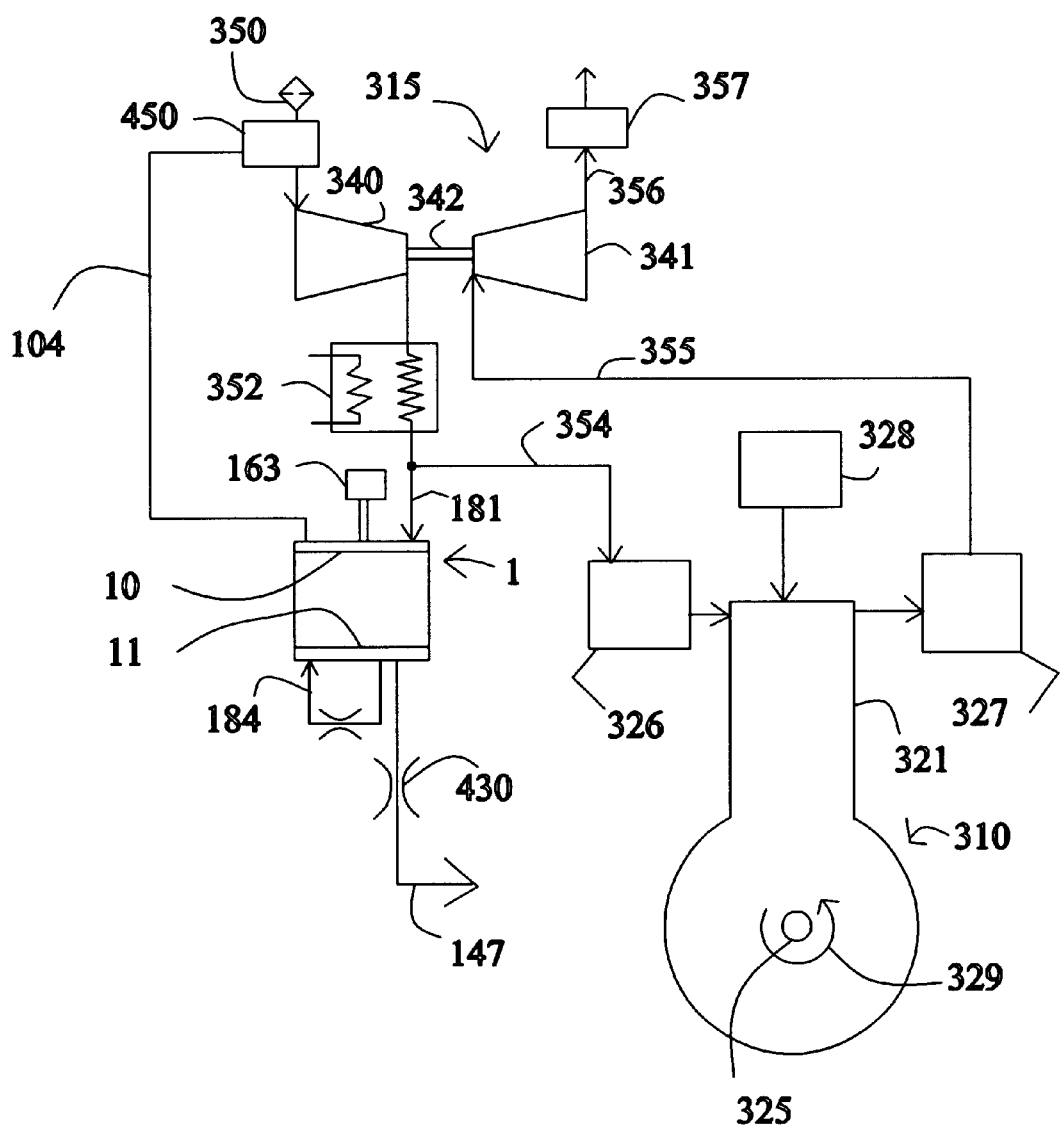
FIG. 12 shows a PSA unit applied to nitrogen enrichment for a turbocharged diesel engine, with the enriched nitrogen blended into the feed air upstream of the turbocharger and the PSA unit.

FIG. 12 shows a PSA unit applied to nitrogen enrichment for a turbocharged diesel engine, with the enriched nitrogen blended into the feed air upstream of the turbocharger and the PSA unit. In this embodiment, similar to that of FIG. 9, the PSA heavy product of enriched nitrogen is recycled and mixed with feed air. This nitrogen enriched mixture is then used as intake air to the diesel engine. Enriching the intake air with nitrogen decreases NOx emissions from a diesel engine.

Nitrogen enriched product is conveyed by conduit 104 to mixing chamber 450 upstream of compressor 340, and is there mixed with feed air accepted through the air filter 350. In this embodiment, the nitrogen-enriched heavy product flow is relatively small, so that the nitrogen enrichment of the mixed stream compressed by turbocharged compressor 340 is to a very modest degree, e.g. to reduce oxygen concentration to 20% $O_2$. Hence, the feed gas delivered from compressor 340 to the PSA by conduit 181 is already modestly depleted in oxygen. While the efficiency of this PSA process to produce byproduct oxygen will be somewhat impaired by any depletion of feed oxygen concentration, performance in nitrogen enrichment is facilitated. The major advantage of this embodiment is the use of a single compressor 340 to compress the combined feed air and nitrogen enriched heavy product stream, rather than separate compressors as in the FIG. 9 embodiment. In FIG. 12, control valve 430 controls the release of oxygen byproduct or waste from the PSA unit. It will be evident that the oxygen product stream could be compressed as in the embodiment of FIG. 10, and injected late in the expansion cycle of the cylinder 321.

FIG. 13

Figure 13:
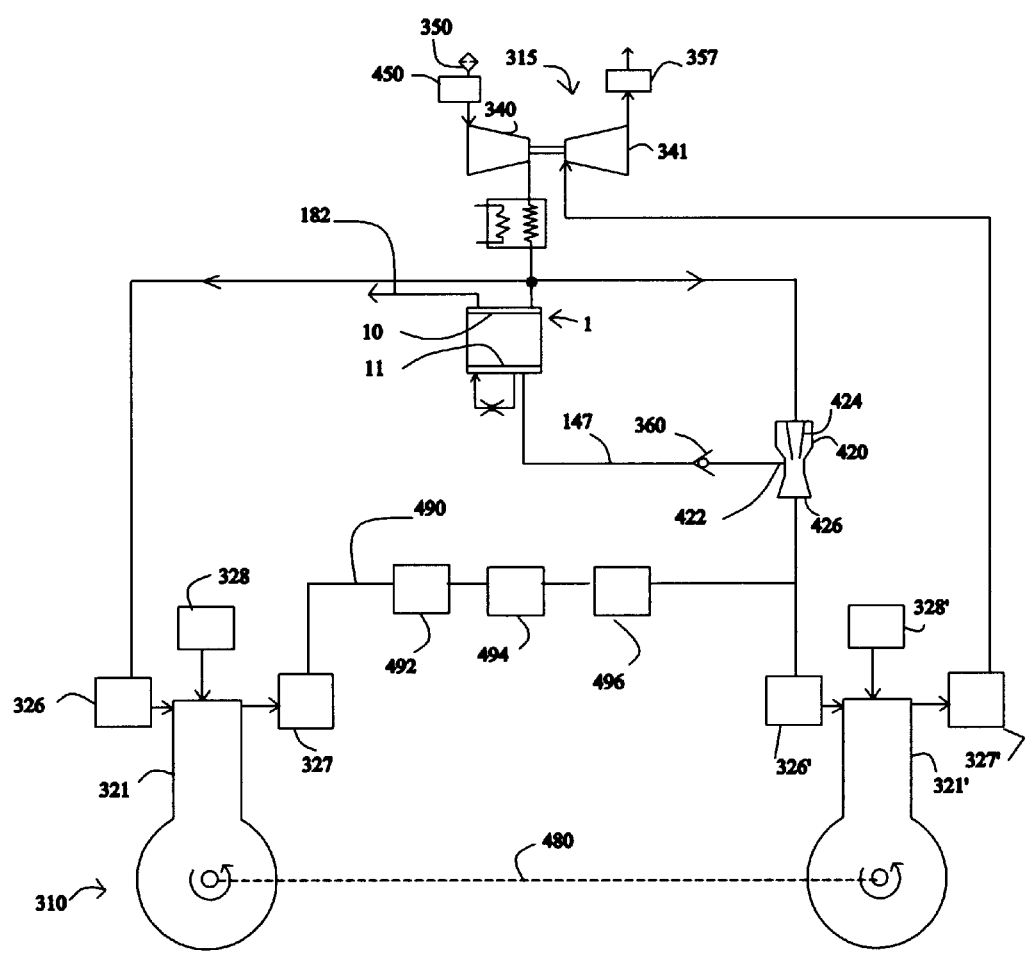
FIG. 13 shows a multi-cylinder engine, in which enriched product stream is supplied to at least one cylinder.

FIG. 13 shows an example of other embodiments with multicylinder engines, in which ambient air or the oxygen-enriched product stream or the nitrogen-enriched product stream may be supplied to a first cylinder or group of cylinders 321, and ambient air or the oxygen enriched product stream or the nitrogen enriched product stream may be supplied to a second cylinder or group of cylinders 321'. The first and second cylinders (or cylinder groups) may be separate engines, but preferably would be distinct cylinders of a single engine coupled by a crankshaft connection 480.

The first cylinder or cylinder group 321 is operated in a rich burn mode so as to produce an exhaust stream in the first exhaust manifold 327 which contains products of incomplete combustion, particularly hydrogen and carbon monoxide. The first cylinder or cylinder group 321 may also be water injected, so as to suppress soot formation while also enhancing the concentration of hydrogen. An EGR conduit 490 is provided to convey exhaust gases from the first exhaust manifold 327 to the second intake manifold 326'. Any particulates are removed in a soot trap 492 in conduit 490. A water gas shift reactor 494 may be provided in the EGR conduit 490 to convert a portion of the carbon monoxide to hydrogen. If desired, a fuel cell 496 may be included in EGR conduit 490 to obtain auxiliary electrical power by oxidation of a portion of the hydrogen and/or carbon monoxide. Residual hydrogen reaching the second intake manifold 326' will be beneficial for a low emission combustion process in the second group of cylinders 321', which operate in a lean burn mode.

In the specific example of FIG. 13, oxygen enrichment to the second group of cylinders enables more complete combustion, enhanced power density and higher thermal efficiency from the lean burn section which is already achieving low NOx as a result of the EGR and hydrogen transfer from the rich burn section of the engine 310. Oxygen enrichment to the first cylinder or cylinder group might also be considered to increase power density with reduced nitrogen diluent load through the entire engine. Alternatively, nitrogen enrichment to the first cylinder or cylinder group 321 may be considered in order to moderate combustion and cylinder liner temperatures there, or to the second cylinder or cylinder group 321' in order to further enhance the dilution effect of EGR for a lower maximum cylinder temperature and consequently even further reduced NOx.

FIG. 14

Figure 14:
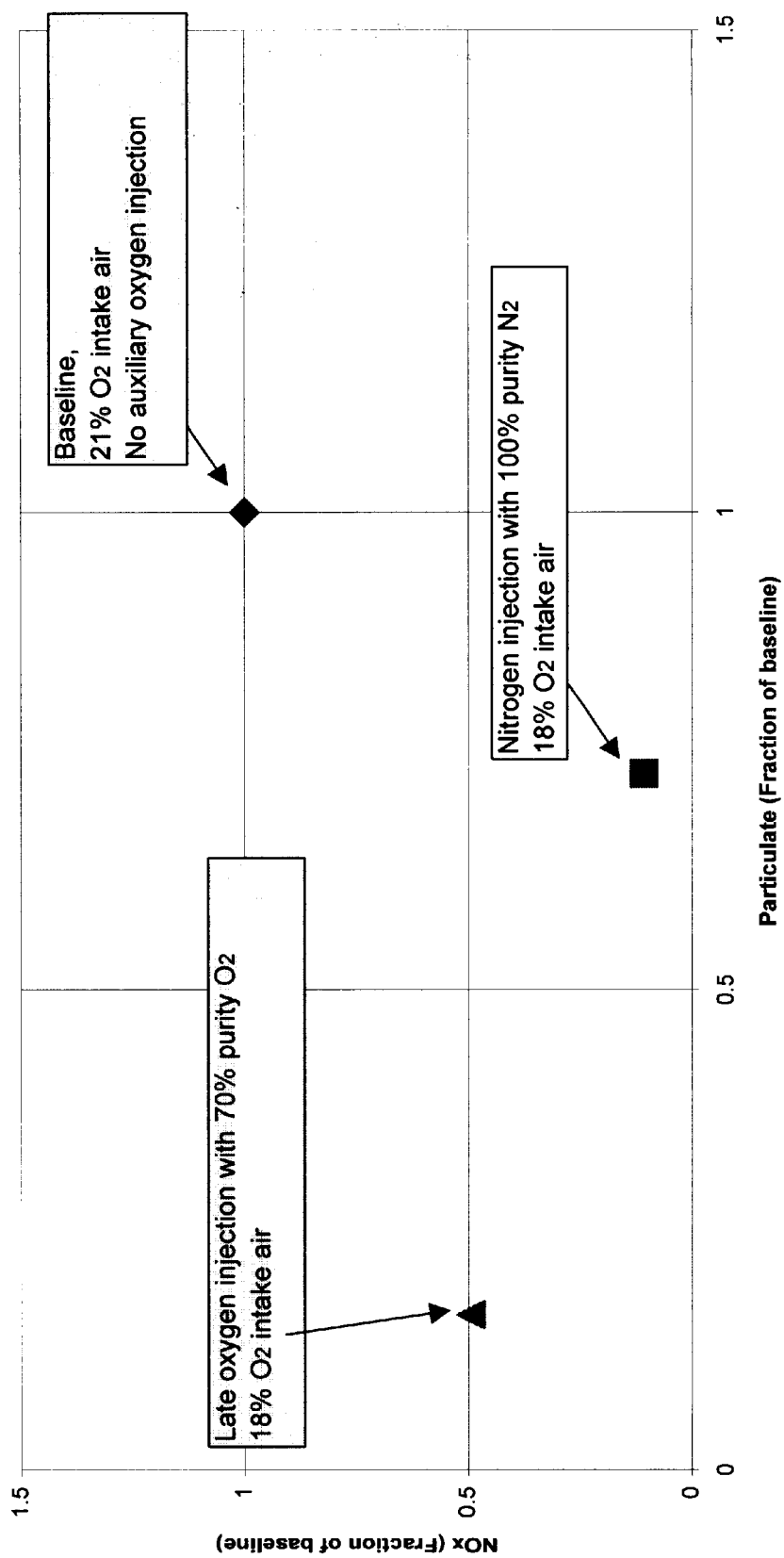
FIG. 14 shows a graph of simulation results obtained for a case of a diesel engine using a slightly nitrogen-enriched stream as intake air paired with a late auxiliary injection of high-purity oxygen.

FIG. 14 shows a graph of computer simulation results obtained for a case of a diesel engine using a slightly nitrogen-enriched stream as intake air paired with a late auxiliary injection of high concentration oxygen. Levels of NOx emissions are shown versus levels of particulate emissions for a representative heavy duty diesel engine. Both are expressed as a fraction of the baseline, which represents NOx and particulates levels obtained for a Diesel engine using regular intake air, with no auxiliary injection. FIG. 14 shows what has been described above, i.e., that the late injection of oxygen contributed to significantly decreased particulates levels through enhanced combustion mixing while the nitrogen-enriched intake caused a simultaneous important decrease in NOx emissions. An additional benefit of this particular embodiment is that the late injection of oxygen also causes an increase in indicated power of the engine that could be used to offset the power requirements of the PSA providing both the high-purity oxygen stream and the nitrogen-enriched stream.

FIG. 14 also shows emissions results for another case where a diesel engine is using the same slightly nitrogen-enriched intake stream paired with an auxiliary injection of pure nitrogen. Despite the extra nitrogen, particulate levels decrease by about 25% due to added mixing, while NOx levels decrease dramatically, likely because of lower combustion flame temperatures. Engine indicated power remains at the same level. The two nitrogen-rich streams necessary in this embodiment could readily be provided by the PSA system of the present invention.

FIG. 15

Figure 15:
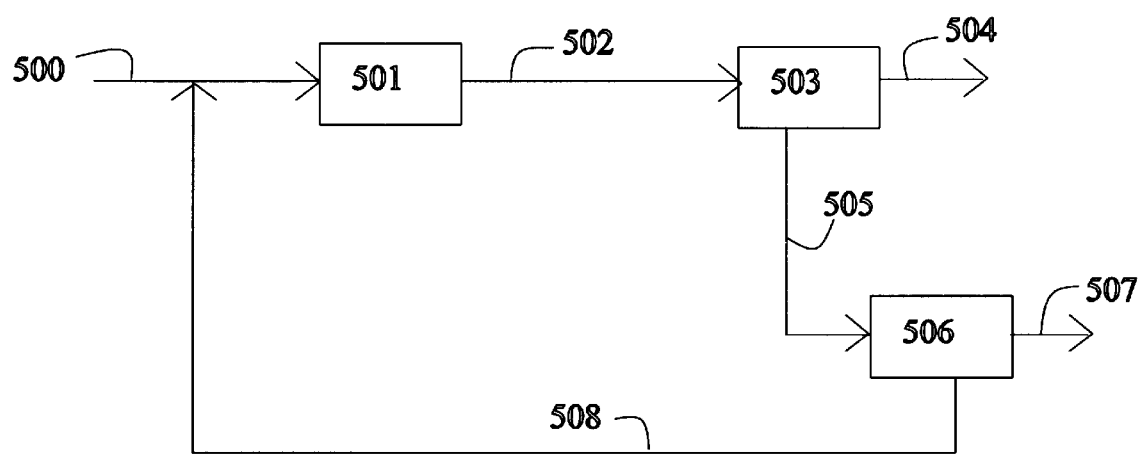
FIG. 15 shows a further embodiment that includes a gas membrane separation system and a PSA unit.

FIG. 15 is a schematic diagram showing the use of a nitrogen separation membrane to produce a large volume nitrogen-enriched gas stream. In particular, an air source 500 is coupled to a turbocompressor 501 for compressing the air. The compressed air is delivered via conduit 502 to a nitrogen gas membrane separation module 503. Such membrane separation modules are well known in the art. The nitrogen gas membrane separation module 503 can produce a nitrogen-enriched gas stream 504 and a first oxygen-enriched gas stream 505. The first oxygen-enriched gas stream 505 is introduced via a conduit into a PSA unit 506. The PSA unit 506 can further oxygen-enrich the first oxygen-enriched stream resulting in a light product oxygen-enriched stream 507 and a heavy product stream 508. The heavy product stream 508 can be recycled with the incoming air stream. A compressor (not shown) and/or a vacuum pump (not shown) can be coupled to the PSA unit 506 as described above in order to provide the necessary pressure for driving the PSA unit 506. The nitrogen-enriched stream 504 and the light product oxygen-enriched stream 507 can be introduced into an internal combustion engine cylinder according to any of the various approaches described above.

According to one embodiment of the system depicted in FIG. 15, the compressed air in conduit 502 can be compressed, for example, to a pressure of about 35 to about 45 psig and have an oxygen concentration of about 23 to about 35%, particularly about 23 to about 30%. The nitrogen-enriched stream 504 can have, for example, a pressure of about 30 to about 40 psig, a nitrogen concentration of about 79 to about 98%, and an oxygen concentration of about 18%. The light product oxygen-enriched stream 507 can have, for example, an oxygen concentration of about 70 to about 90%.

We claim:

1. A process for igniting a gaseous fuel in an internal combustion engine, comprising:

providing at least one pressure swing adsorption module that produces an oxygen-enriched stream;

providing an internal combustion engine chamber that includes an initial combustion zone and a primary combustion zone;

providing a fuel-lean mixture of air and gaseous fuel in the primary combustion zone of the internal combustion engine chamber; and introducing the oxygen-enriched stream from the pressure swing adsorption module into the initial combustion zone of the internal combustion engine chamber under conditions sufficient to ignite the gaseous fuel.

2. A process according to claim 1, wherein the pressure swing adsorption module comprises a rotary pressure swing adsorption module.

3. A process according to claim 1, further comprising mixing gaseous fuel with the oxygen-enriched stream such that the ratio of the amount of gaseous fuel to the amount of oxygen in the oxygen-enriched stream in the initial combustion zone of the internal combustion engine chamber is at least about the stoichiometric ratio required for substantially complete combustion of the gaseous fuel.

4. A process according to claim 3, wherein the gaseous fuel/oxygen mixture is fuel-rich.

5. A process according to claim 3, wherein a first gaseous fuel stream is introduced into the primary combustion zone of the internal combustion engine chamber and a second gaseous fuel stream is introduced into the initial combustion zone of the internal combustion engine chamber.

6. A process according to claim 5, further comprising mixing together the second gaseous fuel stream and the oxygen-enriched stream and then introducing the resulting mixture into the initial combustion zone of the internal combustion engine chamber.

7. A process according to claim 1, further comprising generating a corona discharge in the oxygen-enriched stream under conditions that convert at least a portion of the oxygen to ozone prior to introducing the oxygen-enriched stream into the initial combustion zone of the internal combustion engine chamber.

8. A process according to claim 7, wherein the internal combustion engine chamber includes a displacement element and the ozone-containing, oxygen-enriched stream is introduced into the initial combustion zone at or near the end of a compression stroke of the displacement element.

9. A process according to claim 1, wherein the pressure swing adsorption module further produces a nitrogen-enriched stream that is introduced into at least one of the initial combustion zone or primary combustion zone of the internal combustion engine chamber.

10. A process according to claim 1, wherein the equivalence ratio of the amount of gaseous fuel to the amount of oxygen in the air is about 0.2 to about 1.0.

11. A process according to claim 10, wherein the equivalence ratio of the amount of gaseous fuel to the amount of oxygen in the air is about 0.4 to about 1.0.

12. A process according to claim 3, wherein the equivalence ratio of the amount of gaseous fuel to the amount of oxygen in the oxygen-enriched stream in the initial combustion zone is about 1.0 to about 4.0.

13. A process according to claim 12, wherein the equivalence ratio of the amount of gaseous fuel to the amount of oxygen in the air in the primary combustion zone is about 0.4 to about 1.0.

14. A process according to claim 1, wherein the internal combustion engine chamber comprises an internal combustion engine cylinder.

15. A process according to claim 2, wherein the rotary pressure swing adsorption module operates at a cycle speed of at least 25 cycles/minute.

16. A process according to claim 1, wherein the gaseous fuel is selected from at least one of hydrogen, natural gas, methanol, ethanol, biomass gas, or landfill gas.

17. A process for providing fuel and an oxygen-enriched stream to at least one chamber of an internal combustion engine, comprising:
providing at least one pressure swing adsorption module that produces an oxygen-enriched stream;
providing an internal combustion engine chamber that includes a first combustion zone and a second combustion zone;
providing a fuel-rich mixture of the oxygen-enriched stream and a first fuel in the first combustion zone of the internal combustion engine chamber; and
providing a fuel-lean mixture of air and a second fuel in the second combustion zone of the internal combustion engine chamber.

18. A process according to claim 17, wherein the pressure swing adsorption module comprises a rotary pressure swing adsorption module.

19. A process according to claim 18, wherein the rotary pressure swing adsorption module operates at a cycle speed of at least 25 cycles/minute.

20. A process according to claim 17, further comprising mixing together the oxygen-enriched stream and the first fuel and then injecting the resulting mixture into the first combustion zone of the internal combustion engine chamber.

21. A process according to claim 17, wherein the internal combustion engine chamber comprises an internal combustion engine cylinder.

22. A process according to claim 17, wherein the pressure swing adsorption module further produces a nitrogen-enriched stream that is introduced into the second combustion zone of the internal combustion engine chamber.

23. A process for providing an oxygen-enriched stream to at least one internal combustion engine chamber, comprising:
providing an oxygen-enriched stream;
recycling exhaust gas from an internal combustion engine chamber via a closed loop;
mixing together the oxygen-enriched stream and the recycle exhaust gas to produce an engine chamber feed stream, wherein the oxygen-enriched stream is the only source of fresh oxygen in the engine chamber feed stream; and
introducing the engine chamber feed stream into the internal combustion engine chamber.

24. A process according to claim 23, wherein the engine chamber feed stream comprises argon and carbon dioxide and is substantially free of nitrogen.

25. A process according to claim 23, further comprising compressing the oxygen-enriched stream prior to mixing together the oxygen-enriched stream and the recycle exhaust gas.

26. A process according to claim 23, further comprising compressing the recycle exhaust gas prior to mixing together the oxygen-enriched stream and the recycle exhaust gas.

27. A process according to claim 23, further comprising introducing air into a pressure swing adsorption module to produce the oxygen-enriched stream.

28. A process for providing an oxygen-enriched stream to at least one internal combustion engine chamber, comprising:
introducing a first air stream into an internal combustion engine chamber having a displacement element;
introducing a second air stream into a pressure swing adsorption module to produce an oxygen-enriched stream and a nitrogen-enriched stream;
introducing the oxygen-enriched stream into the internal combustion engine chamber during an expansion stroke of the displacement element; and
introducing the nitrogen-enriched stream into the internal combustion engine chamber during an intake stroke of the displacement element.

29. A process according to claim 28, further comprising compressing the oxygen-enriched stream prior to introducing the oxygen-enriched stream during the internal combustion engine stroke.

30. A process according to claim 28, further comprising mixing air with the nitrogen-enriched stream prior to introducing the nitrogen-enriched stream into the internal combustion engine chamber.

31. A process according to claim 30, further comprising introducing the nitrogen-enriched stream and air into a compressor to produce a compressed mixture.

32. A process according to claim 28, wherein the displacement device comprises a rotor or piston.

33. A process according to claim 28, wherein the displacement device comprises a piston and the internal combustion engine chamber comprises an internal combustion engine cylinder.

34. An internal combustion engine process, comprising:
providing an oxygen-enriched stream;
providing a first internal combustion engine chamber that produces a first engine exhaust stream;
mixing together the oxygen-enriched stream and the first engine exhaust stream to produce a feed steam; and
introducing the feed stream into a second internal combustion engine chamber.

35. A process according to claim 34, further comprising providing at least one pressure swing adsorption module that produces the oxygen-enriched stream.

36. A process according to claim 35, wherein the pressure swing adsorption module comprises a rotary pressure swing adsorption unit.

37. A process according to claim 35, further comprising:
providing an air stream;
dividing the air stream into a first air flow, a second air flow, and a third air flow;
introducing the first air flow into the first internal combustion engine chamber;
introducing the second air flow into the pressure swing adsorption module; and
introducing the third air flow into the second internal combustion engine chamber.

38. A gaseous fuel internal combustion engine system, comprising:
(a) at least one rotary pressure swing adsorption module having a first outlet for discharging an oxygen-enriched stream;
(b) at least one gaseous fuel internal combustion engine chamber having an initial combustion zone; and
(c) a first conduit fluidly communicating between the first outlet of the rotary pressure swing adsorption module and the initial combustion zone of the gaseous fuel combustion engine chamber such that the oxygen-enriched stream can be introduced into the gaseous fuel combustion engine chamber.

39. A system according to claim 38, wherein the gaseous fuel internal combustion engine chamber further comprises a first fuel inlet for introducing gaseous fuel into the initial combustion zone and a second fuel inlet for introducing gaseous fuel into a primary combustion zone.

40. A system according to claim 39, wherein the gaseous fuel internal combustion engine chamber further comprises an air inlet for introducing air into the primary combustion zone of the gaseous fuel combustion engine chamber.

41. A system according to claim 38, further comprising a corona discharge reactor fluidly communicating with the first conduit such that the oxygen-enriched stream can flow through the corona discharge reactor.

42. A system according to claim 38, wherein the rotary pressure swing adsorption module further comprises a second outlet for discharging a nitrogen-enriched stream and the system further comprises a second conduit fluidly communicating between the second outlet of the rotary pressure swing adsorption module and a primary combustion zone of the gaseous fuel internal combustion engine chamber such that the nitrogen-enriched stream can be introduced into the primary combustion zone of the gaseous fuel internal combustion engine chamber.

43. A system according to claim 38, wherein the gaseous fuel internal combustion engine chamber further comprises an air inlet for introducing air into a primary combustion zone of the gaseous fuel internal combustion engine chamber.

44. A system according to claim 38, further comprising a turbocharger module fluidly communicating with an exhaust gas outlet for the gaseous fuel combustion engine chamber.

45. A system according to claim 38, further comprising a compressor in fluid communication with the first conduit.

46. A system according to claim 38, wherein the gaseous fuel internal combustion engine chamber comprises an internal combustion engine cylinder.

47. A system according to claim 38, wherein the rotary pressure swing adsorption module operates at a cycle speed of at least 25 cycles/minute.

48. A system according to claim 38, wherein the gaseous fuel is selected from at least one of hydrogen, natural gas, methanol, ethanol, biomass gas, or landfill gas.

49. A system for providing an oxygen-enriched stream to an internal combustion engine, comprising
(a) at least one pressure swing adsorption module that includes a first outlet for discharging an oxygen-enriched stream, a rotor that includes a plurality of flow paths that receive a plurality of adsorbent laminate arrays, and means for exposing each of the flow paths to discrete pressure levels between an upper operating pressure and a lower operating pressure;
(b) at least one first internal combustion engine chamber; and
(c) a first conduit fluidly communicating between the first outlet of the pressure swing adsorption module and the internal combustion engine chamber such that the oxygen-enriched stream can be introduced into the internal combustion engine chamber.

50. A system according to claim 49, further comprising an exhaust system for the pressure swing adsorption module that includes a vacuum pump coupled to a turbine, wherein the vacuum pump fluidly communicates with the pressure swing adsorption module for removing a nitrogen-enriched stream from the pressure swing adsorption module.

51. A system according to claim 50, wherein exhaust gas from the internal combustion engine chamber powers the turbine of the pressure swing adsorption module exhaust system.

52. A system according to claim 49, wherein the pressure swing adsorption module includes a second outlet for discharging a nitrogen-enriched stream and the system further comprises an air intake for introducing an air stream into the system, a compressor that can receive and compress the nitrogen-enriched stream from the pressure swing adsorption module and the air stream from the air intake resulting in a compressed feed stream, and a second conduit fluidly communicating between the compressor and the internal combustion engine chamber such that the compressed feed stream can be introduced into the internal combustion engine chamber.

53. A system according to claim 52, further comprising a turbine that drives the compressor and an engine exhaust gas conduit that fluidly communicates with the turbine and the internal combustion engine chamber.

54. A system according to claim 52, further comprising an element that can mix the nitrogen-enriched stream and the air stream prior to their introduction into the compressor.

55. A system according to claim 49, further comprising a second internal combustion engine chamber that includes an outlet for discharging engine exhaust gas; an engine exhaust conduit fluidly communicating between the exhaust gas outlet of the second chamber and the first conduit such that the engine exhaust gas and the oxygen-enriched stream can be mixed together and introduced into the first internal combustion engine chamber.

56. A system according to claim 55, further comprising a turbocharger module communicating with an exhaust gas outlet for the first internal combustion engine chamber.

* * * * *

UNITED STATES PATENT AND TRADEMARK OFFICE
CERTIFICATE OF CORRECTION

PATENT NO. : 6,742,507 B2
DATED : June 1, 2004
INVENTOR(S) : Keefer et al.

It is certified that error appears in the above-identified patent and that said Letters Patent is hereby corrected as shown below:

<u>Title page,</u>
Item [75], Inventors, "Denis J. Connor, West Vancouver (CA);" should be deleted.

Signed and Sealed this

Tenth Day of August, 2004

JON W. DUDAS
*Acting Director of the United States Patent and Trademark Office*